(12) United States Patent
Carlson

(10) Patent No.: US 7,051,994 B2
(45) Date of Patent: May 30, 2006

(54) CONTROL VALVE WITH DETACHABLE DESCRETE CURTAIN VALVE ASSEMBLY

(75) Inventor: Bengt A. Carlson, Stamford, CT (US)

(73) Assignee: Belimo Holding AG, Danbury, CT (US)

( * ) Notice: Subject to any disclaimer, the term of this patent is extended or adjusted under 35 U.S.C. 154(b) by 388 days.

(21) Appl. No.: 10/186,456

(22) Filed: Jun. 28, 2002

(65) Prior Publication Data

US 2004/0200990 A1 Oct. 14, 2004

Related U.S. Application Data

(60) Provisional application No. 60/311,902, filed on Aug. 13, 2001, provisional application No. 60/306,280, filed on Jul. 18, 2001.

(51) Int. Cl.
*F16K 7/18* (2006.01)
(52) U.S. Cl. ............ 251/162; 251/192; 251/360; 251/901
(58) Field of Classification Search ........... 251/162, 251/163, 192, 360, 362, 363, 901
See application file for complete search history.

(56) References Cited

U.S. PATENT DOCUMENTS

| | | | | |
|---|---|---|---|---|
| 19,203 | A * | 1/1858 | Osgood | 251/901 |
| 2,534,577 | A * | 12/1950 | Courtot | 137/625.42 |
| 2,784,740 | A * | 3/1957 | Stageberg | 251/901 |
| 3,060,960 | A * | 10/1962 | Waterfill | 251/901 |
| 3,137,315 | A * | 6/1964 | Simpson | 137/625.28 |
| 4,147,183 | A * | 4/1979 | Kalsi | 251/901 |
| 5,238,023 | A * | 8/1993 | Olofsson | 251/901 |
| 5,288,056 | A * | 2/1994 | Baumann | 251/251 |
| 6,557,827 | B1 * | 5/2003 | Aoki | 251/901 |

FOREIGN PATENT DOCUMENTS

JP  WO00-58649  * 10/2000

* cited by examiner

*Primary Examiner*—Eric Keasel
(74) *Attorney, Agent, or Firm*—Thaddius J. Carvis

(57) ABSTRACT

Valves, particularly useful for controlling flow of heat transfer fluids in various heating, air conditioning and ventilation systems, are provided. The valves are of the curtain valve type and operate at very low torque and provide easy assembly and repair. The valve or actuator has an adjustment for the flow coefficient. A disclosed valve comprises a valve body having an inside surface, an inlet port comprised of an opening through the inside surface and enabling fluid flow into the valve body, an outlet port comprised of an opening through the inside surface and enabling fluid flow from the valve body, and a curtain valve closure. The closure adjustably controls fluid flow through the outlet port and is of a modular design including a flexible diaphragm held in an insert positioned at least partially within the outlet port. The insert has at least one dimension larger than a mating surface on the internal surface of the valve body. In this manner the insert is secured without fasteners and properly oriented within the outlet port, facilitates easy assembly and enables the use of low-torque actuators. The valve can employ a radially- and axially-moveable shoe to assure tight close off.

28 Claims, 25 Drawing Sheets

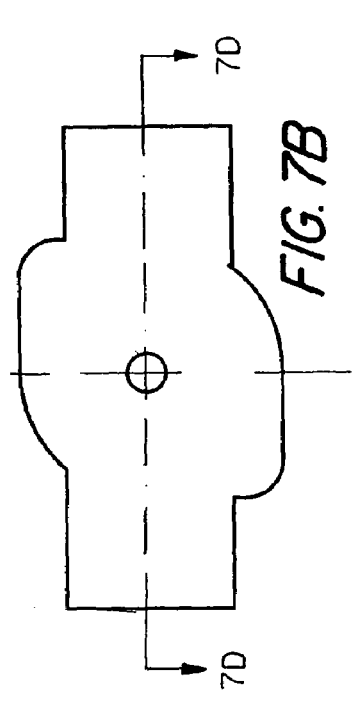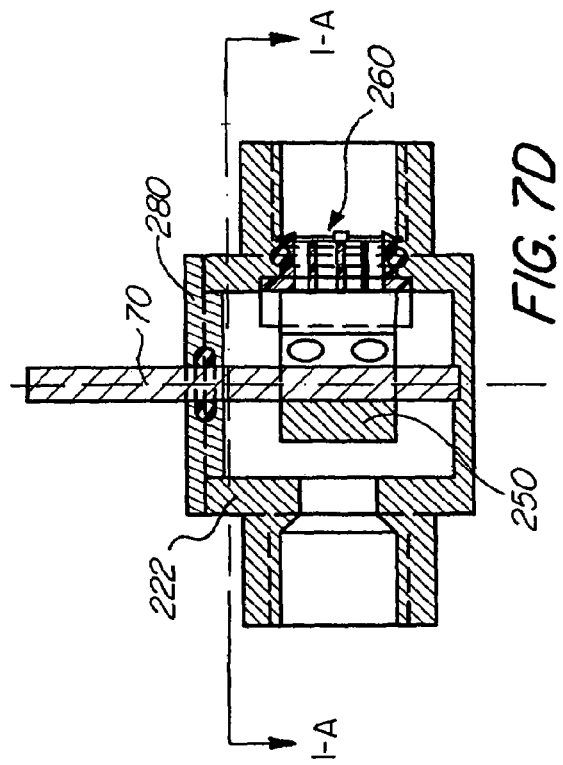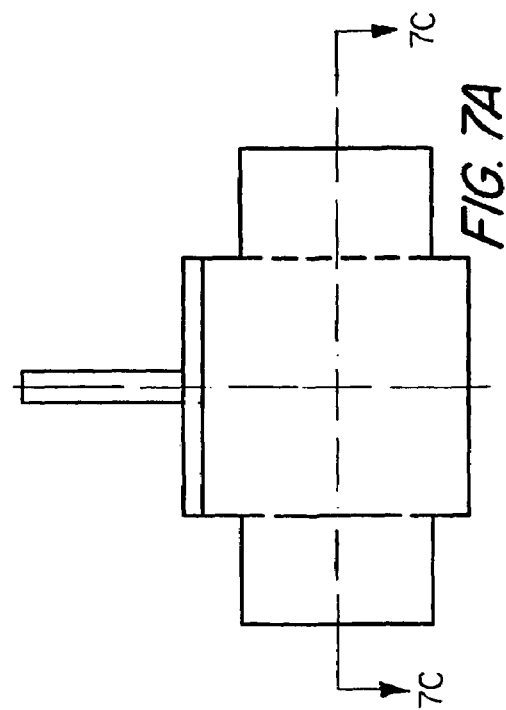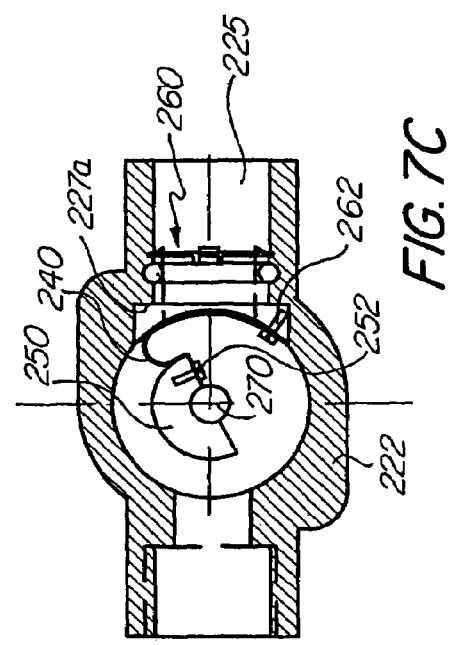

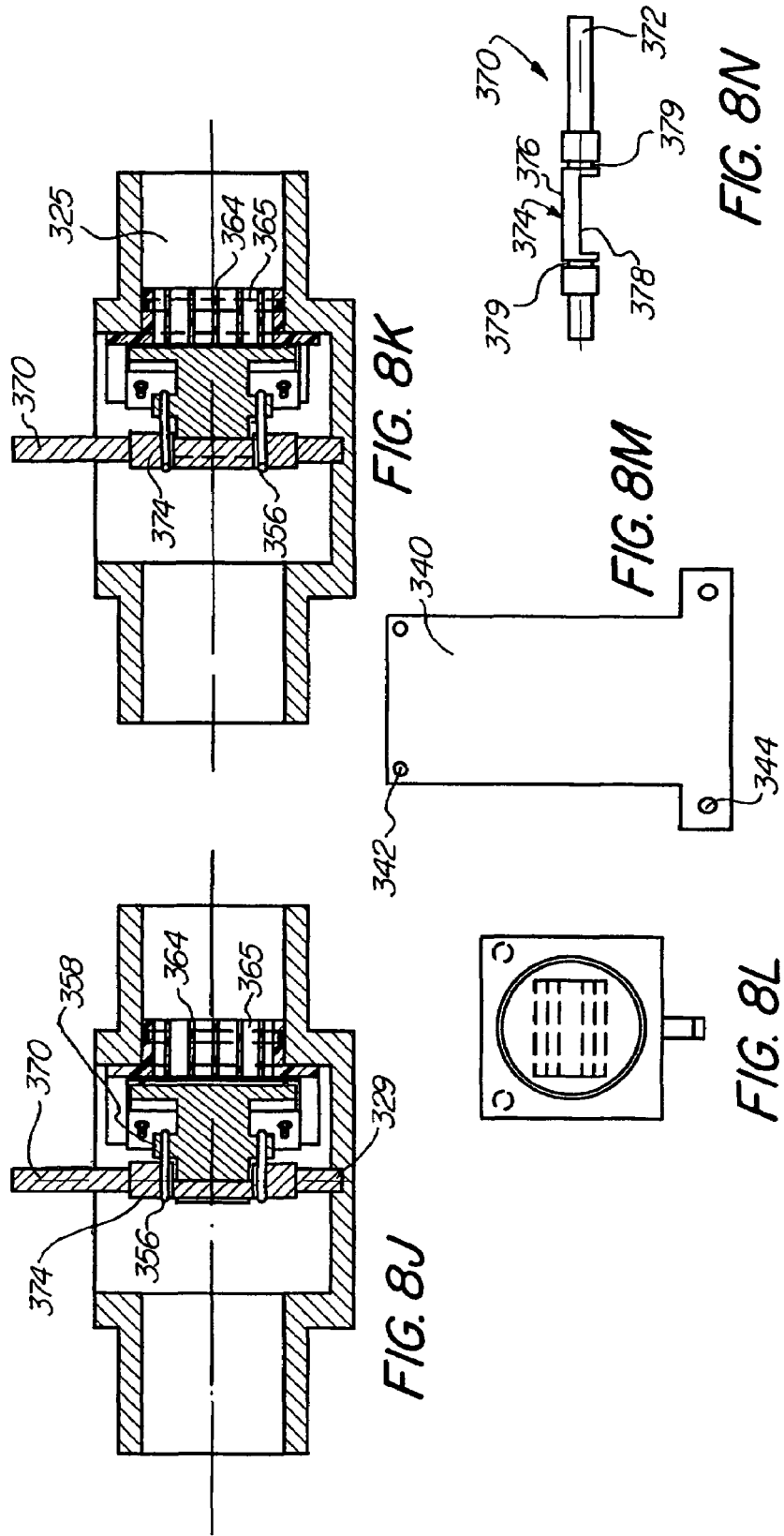

CONTROL VALVE WITH DETACHABLE DESCRETE CURTAIN VALVE ASSEMBLY

"This application claims the benefit of U.S. Provisional Application 60/311,902 filed on Aug. 13, 2001, and U.S. Provisional Application 60/306,280 filed on Jul. 18, 2001."

BACKGROUND OF THE INVENTION

The invention concerns valves, especially those designed for use in controlling flow of heating and cooling fluids in various heating, air conditioning and ventilation systems. The invention provides inexpensive valves of the curtain valve type that can operate at very low torque and have the ability to be adjusted to a range of flow coefficients. Thus, fewer valves must be maintained in inventory to meet demand for a full range of valve sizes. The valves can have a variety of utilities in a wide range of sizes, but are especially useful as zone valves, enabling operation by a simple and inexpensive actuator. In the preferred forms, the valves exhibit a long life span and can be easily replaced or repaired as needed.

There are currently a variety of on-off zone control valves that have the advantage of being relatively inexpensive, making them useful for commercial as well as residential applications. Unfortunately, these valves as presently available suffer from a number of limitations due to their structures which affect the ability to open, close off or perform other control functions at high flow coefficients and differential pressures. As generally available, these valves are not capable of operating with a constant, low close-off torque independent of flow coefficient. Moreover, they each have a predetermined fixed flow coefficient (degrees of opening), which cannot be easily adjusted.

Exemplary of the type of valves and associated actuators in wide use and in need of lower cost alternatives, are those shown in U.S. Pat. No. 6,073,907, and the prior art cited therein. As commonly available, on-off zone control valves control flow of hot or chilled water to terminals and are usually in the sizes of ½", ¾", 1" and 1 ¼". Each size is made in a variety of flow coefficients (Cv). They are available as two-way or three-way valves and are typically operated by on-off thermostats. Power-to-close and power-to-open valves exist. Currently, large inventories are required to meet the full range of flow rates.

A zone control valve of the type shown in U.S. Pat. No. 6,073,907, typically has an essentially cylindrical cavity with circular cross section and two openings for fluid flow in and out of the cavity. In this regard, reference can be made to FIG. 4 of U.S. Pat. No. 6,073,907. The valves have an arm with a closure, e.g., a disk or flapper, mounted on one end. The arm and closure pivot on a shaft rotatable about an axis so that the closure can be moved to cover and uncover an opening by moving over and away from the opening, thereby permitting or stopping the flow. The direction of the flow is from an inlet opening into the cavity and out of the cavity past the closure through an outlet opening. The torque required is first to compress the disk enough for close-off, and then to provide a force sufficient to overcome the force produced by the differential pressure working over the area of the opening. Operating in this manner, fluid pressure strives to open the valve.

A drive mechanism, typically including a cogwheel segment located outside the valve body, rotates the shaft about the axis. The drive can be spring loaded to bias the closure in one way or the other, depending upon if it is a power-to-open or power-to-close valve. The valve, or actuator, is typically capable of operating at pressures of from about 10 psi up to a maximum of about 60 psi. The lower number is valid for high flow coefficients.

The cogwheel segment is driven by a small gear, which in turn is connected to a gearbox and a small AC motor. In a power-to-close valve, the motor runs in one direction only when power is applied and stalls when the mechanism has closed the valve. When power is not applied, the biasing spring causes the motor and gearbox to run backward and open the valve.

One drawback of this prior art design is that low close-off pressures are not satisfactory for the larger flow coefficients. Another, is that the drive mechanism has a limited life span due especially to wear of the cogwheel segment and gear.

Valves having flexible curtain closure members for providing adjustable flow control are available for large-scale installations, but have not been thought suitable for low-cost, HVAC applications. Curtain valves tend to leak at low pressures and tend to be large and to require costly hand assembly in a manner making them unsuitable for use in HVAC and related systems.

It remains that valves currently available for use in HVAC applications have a number of failings in terms of effective operation, high cost, and the need to inventory a large number of sizes. And, as currently available, curtain valves cannot be made economically for HVAC or other systems requiring relatively small sizes.

SUMMARY OF THE INVENTION

There is a need for an inexpensive valve that can be operated to provide an adjustable flow coefficient by application of a very low torque, enabling operation by a simple and inexpensive actuator. There is a further need for a valve of this type that will exhibit a long life span and can be easily replaced or repaired as needed. It would be desirable to provide improvements to curtain valves, to enable their use as very low torque valves available at a low cost to permit their use in HVAC and related systems to facilitate control over a range of flow coefficients.

Accordingly, it is an object of the invention to provide a valve capable of providing adjustable flow control while requiring only low-cost parts.

It is another object of the invention to provide a valve capable of easy assembly.

It is another object of the invention to provide a valve that enables the use of low-torque actuators.

It is another object of the invention to provide a valve which requires low torque for closing at high pressure differentials yet provides for positive closure at low pressure differentials.

It is another object of the invention to provide an adjustable valve which permits a number of flow coefficients for a given valve size.

It is another object of the invention to provide a valve which enables reducing the number of valves necessary to be kept in inventory.

It is another object of the invention to adapt curtain valves for use in HVAC systems.

It is another and more specific object of the invention to provide improvements in curtain valves for providing adjustable flow control suitable for low-cost, HVAC applications.

It is another specific object of the invention to improve curtain valves to assure positive close-off at low pressure differentials.

It is yet another object of the invention to provide a curtain valve with a detachable modular assembly of moveable parts that can be readily inserted into a valve body.

It is yet another object of the invention to provide a curtain valve with a modular assembly of moveable parts that can be readily inserted into a valve body to facilitate economical assembly of curtain valves of sizes suitably small to permit use in HVAC systems.

It is another and more specific object of the invention to provide an inexpensive curtain valve to control fluid flow to enable low-torque actuation for operation by a very simple and inexpensive actuator.

It is another specific object of the invention to provide a curtain valve to control fluid flow in an HVAC system to enable low-torque actuation and provide a longer life span for the actuator.

It is another object of the invention to provide valves particularly adapted to HVAC applications wherein valves are required to operate with fluid flow having large flow coefficients and can yet close off against high pressures.

It is another object of the invention to provide valves particularly adapted to HVAC applications wherein valves are required to close-off at very high pressure while requiring a control actuation essentially independent of the flow coefficient.

It is another object of the invention to provide valves particularly adapted to HVAC applications wherein the flow coefficient can be adjusted to suit the application.

These and other objects are accomplished by the present invention, which provides a curtain valve comprising a valve body having an inside surface, an inlet port comprised of an opening through said inside surface of said valve body and enabling fluid flow into the valve body, an outlet port comprised of an opening through said inside surface of said valve body and enabling fluid flow from the valve body, and a curtain valve closure for controlling fluid flow through said outlet port and comprised of a flexible diaphragm extended between two locations, one of said two locations being a pivotally-moveable support and the other being a fixed support, wherein said curtain valve closure further comprises:

an insert holding said diaphragm, said insert positioned at least partially within said outlet port and having at least one dimension larger than a mating surface on said valve body to thereby secure and orient said insert within said outlet port.

The invention provides a valve having an adjustable flow coefficient, operable at very low torque and particularly useful for controlling flow of heat transfer fluids in heating, air conditioning and ventilation systems, which comprises a valve body having an inside surface, an inlet port comprised of an opening through the inside surface and enabling fluid flow into the valve body, an outlet port comprised of an opening through the inside surface and enabling fluid flow from the valve body, and a curtain valve closure, wherein the closure is adjustable to different flow coefficients to control fluid flow through the outlet port and is of a modular design including a flexible diaphragm connected to an insert positioned at least partially within the outlet port, and the insert has at least one dimension larger than a mating surface on the internal surface of the valve body to thereby secure the insert to the valve body without fasteners and to properly orient it within the outlet port.

In one preferred form of the above and other embodiments, the insert comprises a curtain valve support extending over an opening which aligns with the outlet port when positioned in the valve body, comprising at least one support member suspended over the opening, preferably a plurality of support members extending over the opening and dividing it into at least two passages.

In another preferred form of the above and other embodiments, the insert comprises one or more spring biased hooks at its outlet end and said valve body comprises a recess to mate the hook or hooks, whereby positioning of the hook or hooks within said recess secures the insert into the valve body in position in the outlet port.

In another preferred form of the above and other embodiments, a shoe is provided which is adapted to press against the curtain and insert when the valve is closed. In some embodiments means are provided for achieving eccentric shoe movement.

In another preferred form of the above and other embodiments, the insert comprises a seal on said portion of said insert which extends though said outlet port. In preferred forms, the seal can be an O-ring or an integrally molded section of said insert.

Many other preferred aspects and variations of the invention as set forth above are shown in the drawings and described in detail below.

DESCRIPTION OF THE DRAWINGS

The invention will be better understood and its advantages will become more apparent from the following written description, especially when read in light of the accompanying drawings wherein:

FIG. 7A is a side elevation of an alternative two-way valve according to the invention.

FIG. 7B is a top plan view of a valve as shown in FIG. 7A.

FIG. 7C is a cross section taken along line 7C—7C in FIG. 7A.

FIG. 7D is a cross section taken along line 7D—7D in FIG. 7B.

FIG. 8J is a cross section of the valve shown in FIG. 8A, taken on a line 8J—8J in FIG. 8H.

FIG. 8K is a cross section of the valve shown in FIG. 8A, taken on a line 8K—8K in FIG. 8I.

FIG. 8L is a front elevation a valve insert for a valve of the type shown in the views of FIGS. 8A–8K.

FIG. 8M is a curtain closure element for a valve of the type shown in the views of FIGS. 8A–8K.

FIG. 8N is an actuator shaft for a valve of the type shown in the views of FIGS. 8A–8K.

DETAILED DESCRIPTION

The following description illustrates two-way and three-way, power-to-open valves as exemplary of the invention and will be referenced unless another structure is specifically referred to. In all cases, the invention will be described in a preferred form wherein a curtain valve employs an insert, which can be installed by pushing the insert in place in an outlet port of the valve. A primary advantage the invention is that it takes a very small torque to operate this two-way or three-way valve.

The various views described below show valves of this preferred type, each being described as comprising a valve body, an inlet port to the valve body, an outlet port to the valve body, and a curtain valve closure comprised of a flexible diaphragm held between two locations, one of the two locations being moveable, e.g., at a pivot arm, and the other being stationary, e.g., at a support means adapted to hold said flexible diaphragm. An insert is preferably provided and is preferably held in operable position in the outlet without fasteners. In several embodiments, a pressure element, referred to herein as a shoe, can provide an added degree of sealing, which enhances operation at low pressure differentials. The various embodiments will be explained in relation to the drawings wherein the elements in FIGS. 1–3E will be identified with two digit numbers. Parts in other embodiments which correspond to these numbered parts will be given three digit numbers ending with the two digit numbers assigned for FIGS. 1–3B, but having a first digit corresponding to other parts in that embodiment.

Figure 1:
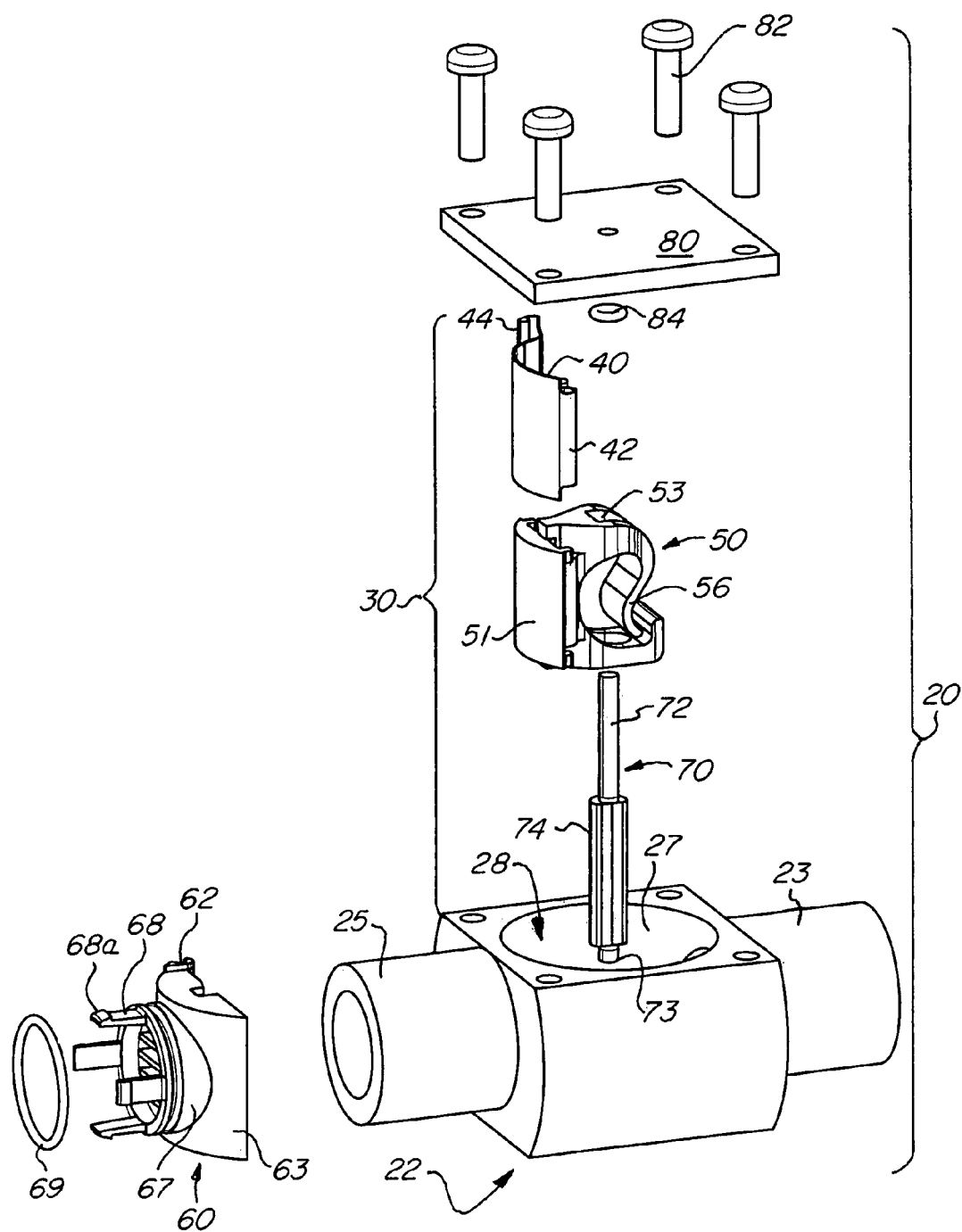
FIG. 1 is an exploded perspective view showing a two-way valve according to the invention.

Reference is first made to the embodiment of one preferred form of the invention illustrated in FIGS. 1 through 3E, wherein FIG. 1 is shows an exploded view of a curtain valve 20 according to the invention. The valve 20 has a body 22 with an inlet 23 and an inlet connector 24 and at least one outlet 25 and one associated outlet connector 26. Both connectors are adapted to be connected to pipes or other conduits (not shown). The inner surface 27 of the valve body 22 extends between the inlet 23 and outlet 25 to define a flow passage. The flow passage includes a valve cavity 28. The cavity 28 can have any shape, but in most of the illustrations it is shown as cylindrical. The cavity 28 is shown in FIG. 1 as having a single inlet 23 and one outlet 25, but could have multiple inlets and/or outlets as the needs dictate.

Figure 2:
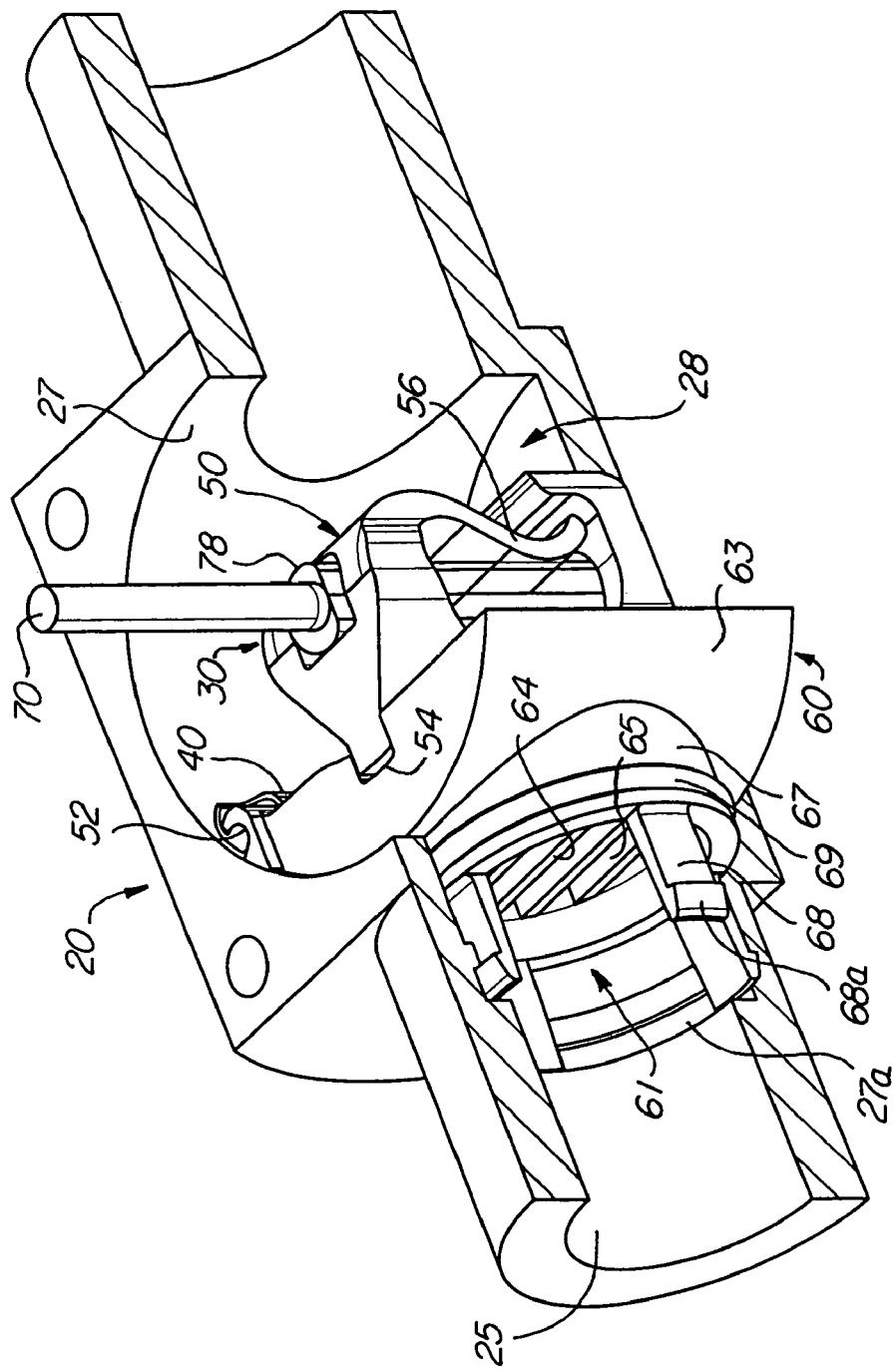
FIG. 2 is a perspective view, partially cut away, of a valve as shown in FIG. 1.

FIG. 2 shows in a partially broken away section of the valve 20 of FIG. 1, showing how the parts shown in the exploded view of FIG. 1 are assembled. The curtain valve 20 is illustrated as including a closure insert 30 comprised of a flexible diaphragm 40 supported between two locations, one of said two locations 52 being at a rotatable pivot arm 50 and the other 62 on outlet closure support 60 (on shaft 70). The flexible diaphragm 40, also referred to as a curtain closure, has first and second gripping sections 42 and 44, respectively, which are shown as enlarged end rib areas but can be formed in any manner effective for the purpose of securing them between two support locations. Reference can be made to FIGS. 14A–14F for a number of alternative structures for the flexible diaphragm 40. In FIGS. 1–3B, the two support locations 52 and 62 are illustrated as comprising grooves which permit the enlarged gripping sections of the diaphragm to slide into secure supporting connections. Any suitable means for securing the diaphragm 40 in place can be employed, e.g., screws, snaps, hooks and eyes, rivets, stitching, wire, adhesive, or the like. The body can be made of plastic or metal. The construction of the diaphragm will be discussed below.

The flexible diaphragm 40, pivot arm 50, outlet closure support 60, shaft 70 supporting the pivot arm and first support location 52 are all shown as comprised in the insert 30, which is preferably held in operable position in the outlet without fasteners. A cover 80 is affixed to the valve body 22 by suitable means such as fasteners 82 which can be threaded or snap-fit fasteners (e.g., 2–6 screws) suitable for the purpose. In some cases it will be useful to permanently attach the cover by means of adhesive or welding. An O-ring 84 is preferably provided to form a fluid tight seal between the cover 80 and the shaft 70. The cover 80 can be located at any one or more of the wall sections of body 22.

FIGS. 1 and 2 show detail of the shaft 70. The shaft 70 is shown to include a central drive shaft 72 and an enlarged cam section 74. The cam section has a substantially rounded surface 76 extending the major portion of the circumference and a flattened area 78 on one side (seen also in FIGS. 3C–3E). Rotatable pivot arm 50, preferably made of a durable structural plastic, such as nylon or Delrin, for curtain closure 40 is supported on and rotates with shaft 70, which runs through the cover 80 and the cavity 28. The part of section 72 of the shaft 70 that extends through the lid 80 and outside the valve body 22 can be turned by an actuator (not shown here, but see FIGS. 15A and 15B). The opposite end 73 of shaft 70 is supported at the bottom interior surface of valve cavity 28, preferably in a recess (not shown here, but see recess 229 in FIG. 7D). It is an advantage of the invention that valve operation requires less torque and the actuator required to turn the shaft 70 can be smaller and less expensive than actuators necessary for current HVAC control valves of the type described above.

FIG. 2 shows insert 30 positioned at the outlet 25. The closure support 60 is shown in nested relation in the outlet 25 and has a convex outer surface 63 contacting the inner surface 27 of the valve body 22. The closure support 60 has an outlet opening 61 with a plurality of diaphragm support members 64 positioned across it. The number of diaphragm support members is optional, typically from 1 to 10, and their extent across the opening 61 and shape and pattern are optional. At least one diaphragm support member 64 should be provided and should extend at least partially across the opening 61. Preferably, a plurality of support members 64 extend across the opening 61 and divide it into several passageways 65 for fluid to flow out of cavity 28. The closure support 60 is shown with the support members 64 forming a curved internal face 66 (see corresponding to part 166 in FIG. 4) that extends into the cavity 28 beyond the internal surface 27. The face 66 can have a slight slant, be flat, concave (shown), convex or of compound shape as predetermined for proper variation of Cv and pressure differential during closing.

Figure 3B:
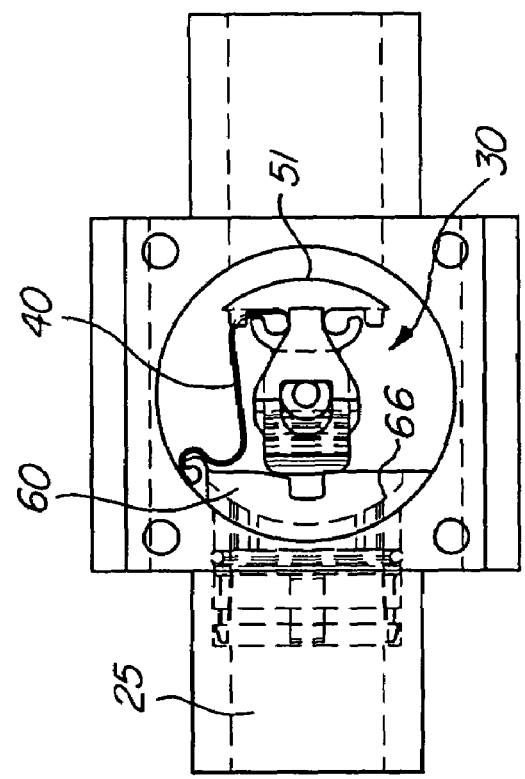
FIG. 3B is a top plan view of a valve as shown in FIG. 1 with the cover removed and the curtain closure in open position.
Figure 3A:
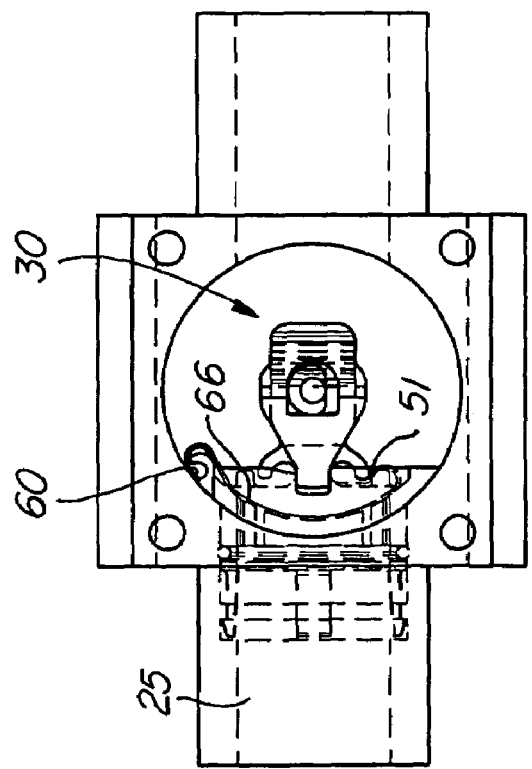
FIG. 3A is a top plan view of a valve as shown in FIG. 1 with the cover removed and the curtain closure in closed position.
Figure 3C:
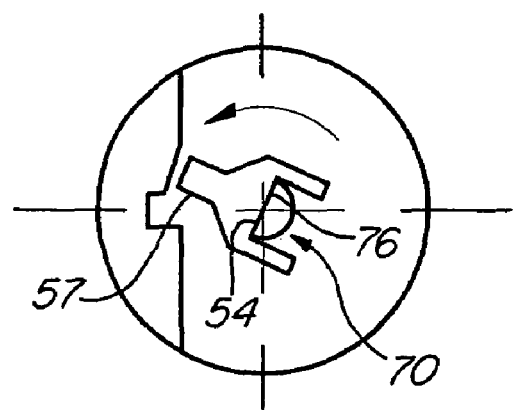
FIG. 3C is a schematic top plan enlarged view of a the camming mechanism for a valve as shown in FIG. 1, showing the camming mechanism in movement from open to closed position.
Figure 3D:
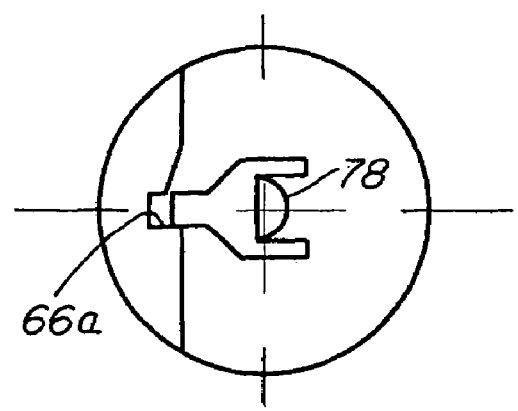
FIG. 3D is a view similar to that of FIG. 3D showing the camming mechanism in closed and unlocked position.
Figure 3E:
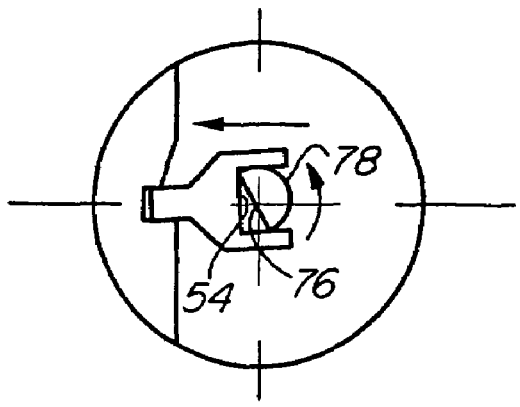
FIG. 3E is a view similar to that of FIG. 3C showing the camming mechanism moving into closed and locked position.

Rotatable pivot arm 50 is comprised of a number of component parts which enable the arm to hold a moveable end 42 of the flexible diaphragm 40 and move it between closed position shown in FIG. 3A and open position shown in FIG. 3B. Rotatable pivot arm 50 is also operable to move radially and exert closing force holding diaphragm 40 against support 60 to assure a tight seal independent of fluid pressure. FIGS. 3C through 3E are schematic enlarged top plan views of a portion of a camming mechanism for a valve as shown in FIG. 1, showing how radial movement of the shaft 70 enables the pivot arm 50 to move first rotationally and then radially, thereby moving the pivot arm 50 from an open position toward a closed and locked position.

In FIG. 3C, the flat side 76 of the enlarged section 74 of shaft 70 is seen pressed against a cam following front edge surface 54 of opening 53 of the pivot arm 50. Reference to FIG. 2 shows an integral spring 56 providing a radial biasing pressure. In this position, as the shaft 70 rotates, the arm 50 will rotate with it and move diaphragm toward closed position as shown in FIG. 3A. It is also possible to use a curtain that is mounted on a free rolling roller (not shown), and that the arm is spring loaded, so it can follow the face of the insert. In FIG. 3D, the shaft 70 has been fully rotated counter clockwise to the closed position shown. In this position, leading edge 57 of arm 50 comes into contact with stopping surface 66a of outlet closure support 60. As the shaft 70 rotates counterclockwise, the effective radius of the shaft 70 increases and pushes against the cam following surface 54 and moves the whole arm 50 radially outward. The shaft will continue its rotation while the pivot arm rotation is stopped until the rounded camming surface 78 contacts cam following front edge surface 53 to, complete the outward radial extension. FIG. 3D is a view similar to that of FIG. 3C showing the camming mechanism in closed and unlocked position. FIG. 3E is a view similar to that of FIG. 3C showing the camming mechanism in closed and locked position.

As can be seen by reference to FIGS. 3A and 3B front surface 51 of the pivot arm 50 is shaped to conform to the inner surface 66 of the closure support 60 so that when flexible closure 40 is moved to closed position as illustrated in FIG. 3A, the surfaces mate and a good seal can be achieved. This is a distinct advantage of the invention, which is especially useful at low operating pressures where sealing might be a problem for some operations. It can be seen that shaft 70 extends lengthwise through partially squared opening 53 of rotatable pivot arm 50. As shaft 70 is rotated counter clockwise from the valve open position as shown FIG. 3B to the closed position shown in FIG. 3B, flat surface 78 on enlarged cam section 74 is forward to engage the front edge 54 of opening 53 of rotatable pivot arm 50.

In the arrangement just described, counter clockwise movement of the shaft will move the rotatable pivot arm 50 and bring with it the moveable end 42 of flexible closure diaphragm 40 and extend it across the opening 61 of the closure support 60. In some embodiments, this motion alone will be sufficient for sealing and no camming is required, but for the preferred operation, especially under low-pressure conditions, rotation of shaft 70 will continue as the pivot arm 50 is stopped and ceases rotary movement, by either being held against a stop (as shown) or by the resistance of the fully-extended diaphragm closure 40. The continued motion will cause the substantially rounded surface 78 of the camming section 74 of shaft 70 to push against the front edge 54 of squared opening 53 and, thereby, radially move the closure support 60 so that the front surface 51 is pressed against the flexible diaphragm 40 and it into tightly-sealed relation with the curved internal face 66 of the closure support 60. In this embodiment, the camming arrangement of the shaft 70 and the closure support 50 function to move the front surface 51 both axially to position it and then radially to provide closing pressure. Rotation of the shaft 70 in the opposite direction likewise causes radial and axial movement, but this time in reverse, to open the valve to the position shown in FIG. 3B. Because this axial movement of the front edge 51 of pivot arm 50 can be likened to the movement of a brake shoe, a the moveable front edge 51 having the capability for axial and radial movement can be referred to as a shoe.

Forward nipple 67 on closure support 60 is shown to include flexible snap-fit prongs 68 and positioned within and preferably locked in the outlet 25. Forward nipple 67 extends into the outlet opening 25 and is preferably sealed within the opening by suitable seal means 69, such as an O-ring as illustrated or similar separate or integrally molded seal, to prevent by-pass leakage and/or to fasten the insert. The flexible snap-fit prongs 68 be provided with a single or plurality of locking means, e.g., raised ends 68a shown shaped to function as hook means, preferably spring biased by virtue of the material of construction, which can be either metal or plastic. One special advantage of the hook means 68a is that they hold closure support 60 in place even in the case of a misapplied valve, e.g., attached to the system in the reverse of the correct flow direction. The closure support 60 is preferably made of a plastic selected from the group consisting of Tefzel polymer, Delrin polymer, Teflon polymer or a combination of any of these, Tefzel polymer being the most preferred. The hook means 68a can be configured to cooperate with a recess, such as a groove 27a, or the like, in the valve body.

The closure support 60 holding the curtain closure diaphragm 40 is shown to be positioned at least partially within said outlet port 25 and having at least one dimension larger than the dimension of mating outlet port 25 at the inner surface 27 of valve body 22 to thereby secure and orient said insert within said outlet port. The mating surface can be within a recess, such as 227a as shown in FIG. 7C, or it can be against the inner surface 27 of the valve body 22 as in FIGS. 1–3B. The mating surfaces of the closure support 60 and the valve body 22 and/or its inner surface can be shaped to be complementary in such a way as to cause positive seating of the closure support 60 and make it resistant to displacement during operation or installation.

The maximum differential pressure the valve 20 can handle is increased by providing the support members 64 as described. The provision of closure support 60 according to the invention with support members 64 designed specifically for the desired flow conditions, the operating pressures and the material of construction of the flexible closure diaphragm 40, enables various pressures and flow conditions to be accommodated in a convenient and practical manner. Normally, there would be a risk that the flexible closure diaphragm 40 could be pushed through the outlet 25 by the differential pressure on the fluid between the cavity 28 and the outlet 25. This is avoided according to the invention by the closure support 60 support members 64, which in the form illustrated, divide the outlet 61 into a number of smaller openings or passages of suitable shape, for example slots 65. The slots 65 can also be helpful in reducing cavitation, especially a problem in some valves during high flow rate operation.

The ability of the invention to enable practical variation of the thickness of the flexible closure diaphragm 40 and its composition can also be important considerations. The flexible closure diaphragm 40 will preferably be made of a material that comprises a member selected from the group consisting of rubber, such as natural, and synthetic rubbers including silicone rubber, and flexible plastic. It can be reinforced by a suitable material, such as a textile, metal wire mesh or plastic or metal structural materials of the type used for flexible bands, ribbons and belts.

The valve is shown in FIG. 3A as being closed with flexible closure diaphragm 40 covering the channels 65. By turning the shaft 70 clockwise, the flexible closure diaphragm 40 will roll off the inner face 66 of outlet closure support 60 and uncover the channels 65 and open the valve (FIG. 3B). The support ribs 64 support the flexible closure diaphragm 40 when it is closed and prevents the differential pressure from pressing the flexible closure diaphragm 40 out through the channels 65. The supporting ribs 64 are shown as straight dividers, but can have any shape as long as they can give support to the flexible closure diaphragm 40.

In order to prevent fluid to flow from by-passing the support 60 in the outlet port 25, the support 60 is provided with a suitable seal 69, such as an O-ring as shown. Alternatively, the seal 69 can be formed integrally with the insert 44, which is preferably made of plastic, for example molded in a Delrin® polymer, Teflon® polymer or a combination of these. The O-ring seal 69 can also provide some resistance against pushing out into the cavity 22, if the valve is piped backwards by mistake. This function can be made more effective, by providing the support 60 with one or more hook means 68a, which can employ spring action and can interlock with a groove, rim or recess in the outlet port 25. Preferably, more than one hook or other clipping means is provided.

The installation of the different parts is simple and is an advantage of the invention. The insert 30 is comprised of flexible diaphragm 40, pivot arm 50, support 60 and shaft 70. These parts can be assembled as a unit outside of the valve body 22 and inserted as a unit or they can be installed in any convenient sequence. For example a completed assembly of flexible diaphragm 40, pivot arm 50, support 60 and shaft 70 can be inserted at once or the support 60 can be inserted first, followed by the flexible diaphragm 40, pivot arm 50 and shaft 70. Other sequences can be employed as practical. The support 60 is preferably installed by inserting it into the opening 25 and snapping it into place. The diaphragm 40 is preferably attached to the pivot arm prior to insertion into the opening 28 and attached to the support, if not yet achieved. The shaft 70 can be moved to its proper position at the bearing point and the lid 80 mounted. The invention enables assembly in a manner particularly efficient for small units and can be modified as desired when space within the valve body permits.

The valve as illustrated can close off against low and high pressure providing a good valve for both of these applications. Advantageously, this is true against even very low pressure due to the provision of means for enabling axial movement of the rotatable pivot arm 50 to assure a positive seal. This is important because the differential pressure is sometimes insufficient to force the flexible closure diaphragm 40 into good contact with the support members 64 and/or inner face 66 the closure support 60. The illustrated arrangement enables the valve to close without any leakage regardless of the pressure.

Figure 13A:
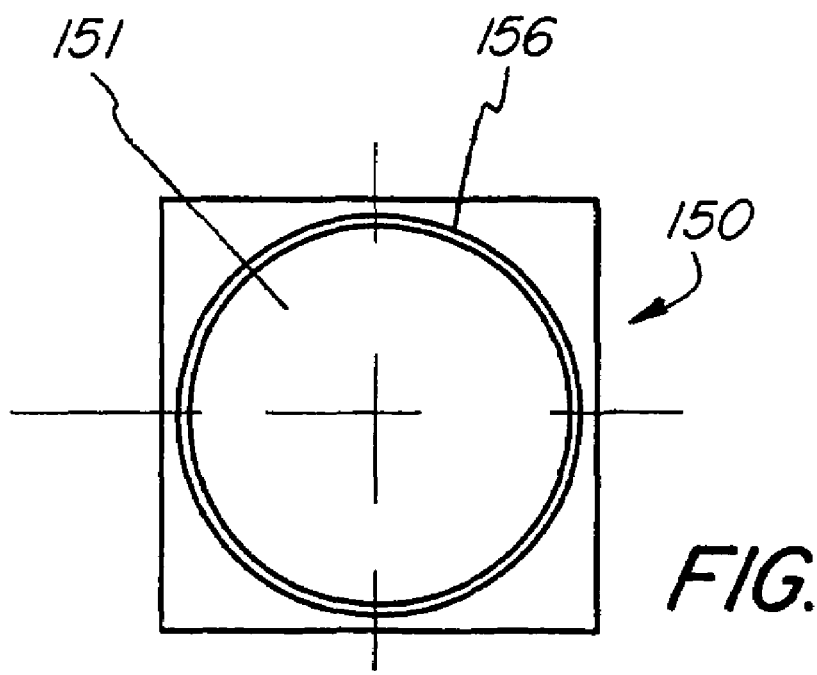
FIG. 13A is a front elevation showing detail of a shoe face having a sealing rim extending above the surface.
Figure 13B:
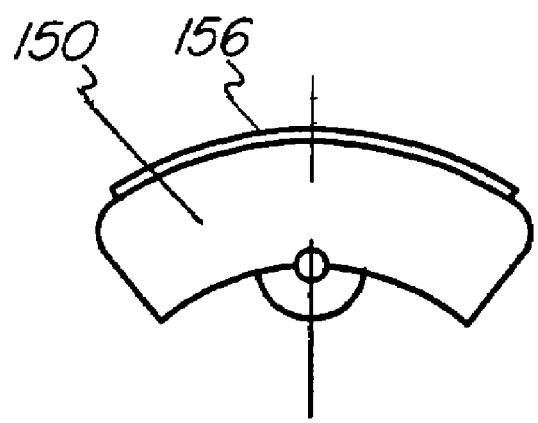
FIG. 13B is a top plan showing the shoe and sealing rim illustrated in FIG. 13A.
Figure 14F:
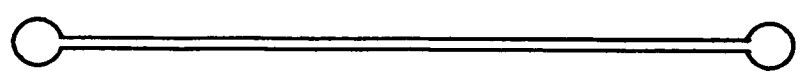
FIGS. 14A–14F are front elevations followed by side views for three variations of curtain closures suitable for use in the valves of the invention.
Figure 14E:
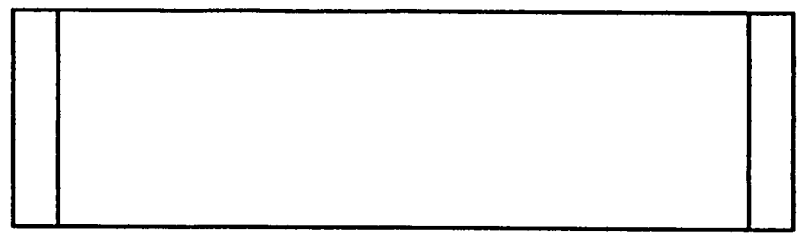
Figure 14D:
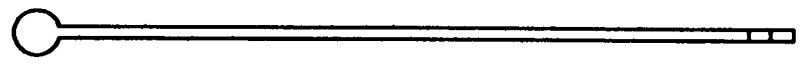
Figure 14C:
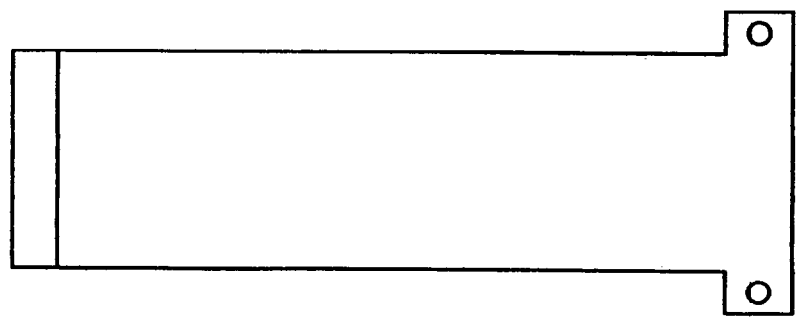
Figure 14B:
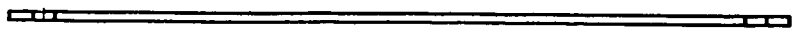
Figure 14A:
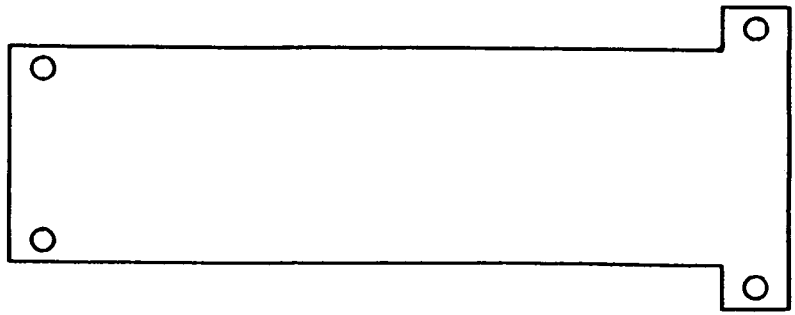

In order to reduce the pushing force requirement while still assuring a positive seal, the surface 51 of the pivot arm or shoe 60 which is facing the curtain, can have a raised rim slightly larger than the outlet opening 25, such as 156 as illustrated in FIGS. 13A and 13B. When the shoe 150 is applied to the back of a closure diaphragm 40, the rim 156 enhances the closing pressure on the diaphragm 40. Alternatively, the rim can be located on the inner surface 66 of the support 60.

Figure 4:
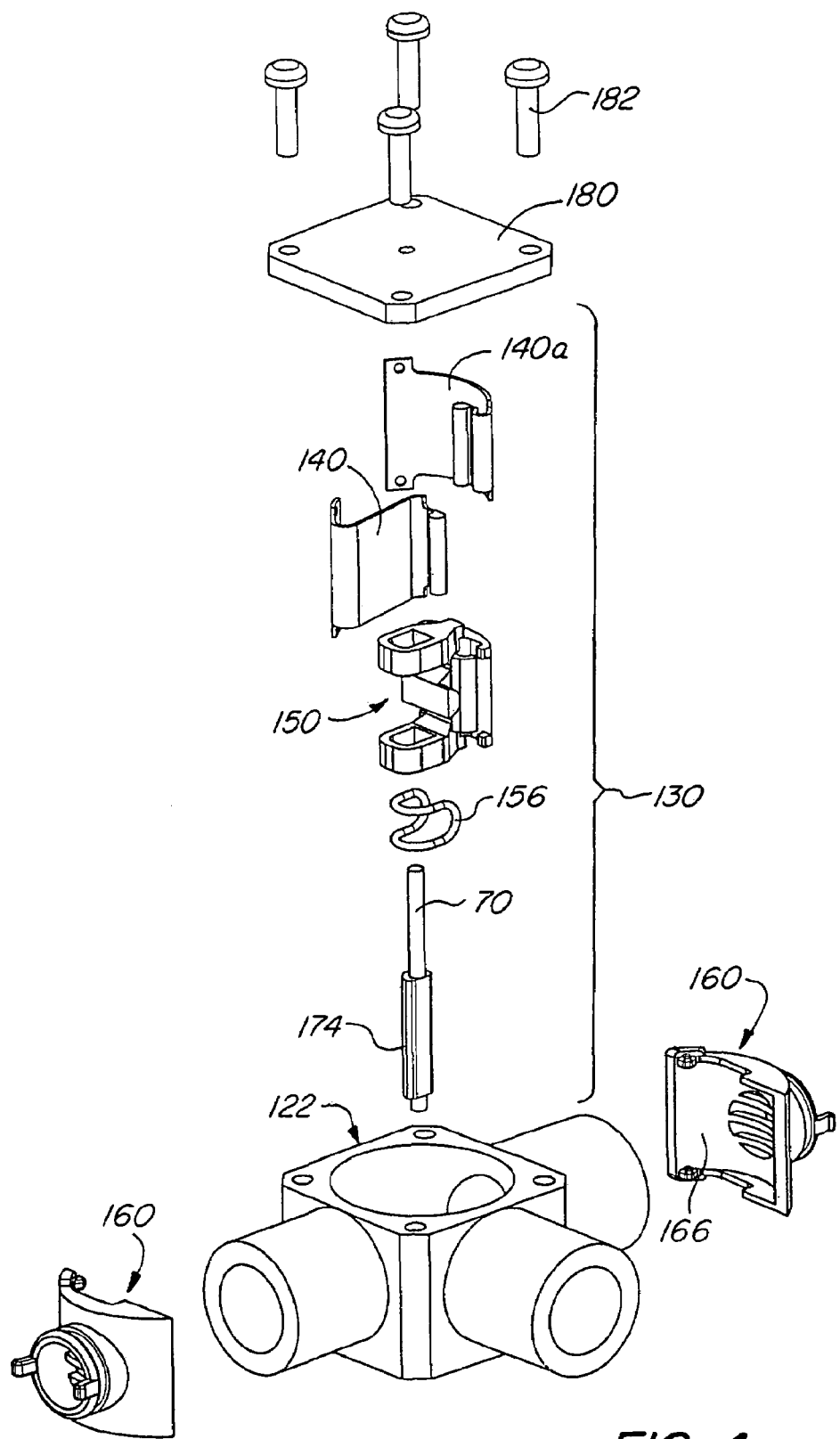
FIG. 4 is an exploded perspective view showing a three-way valve according to the invention.
Figure 5:
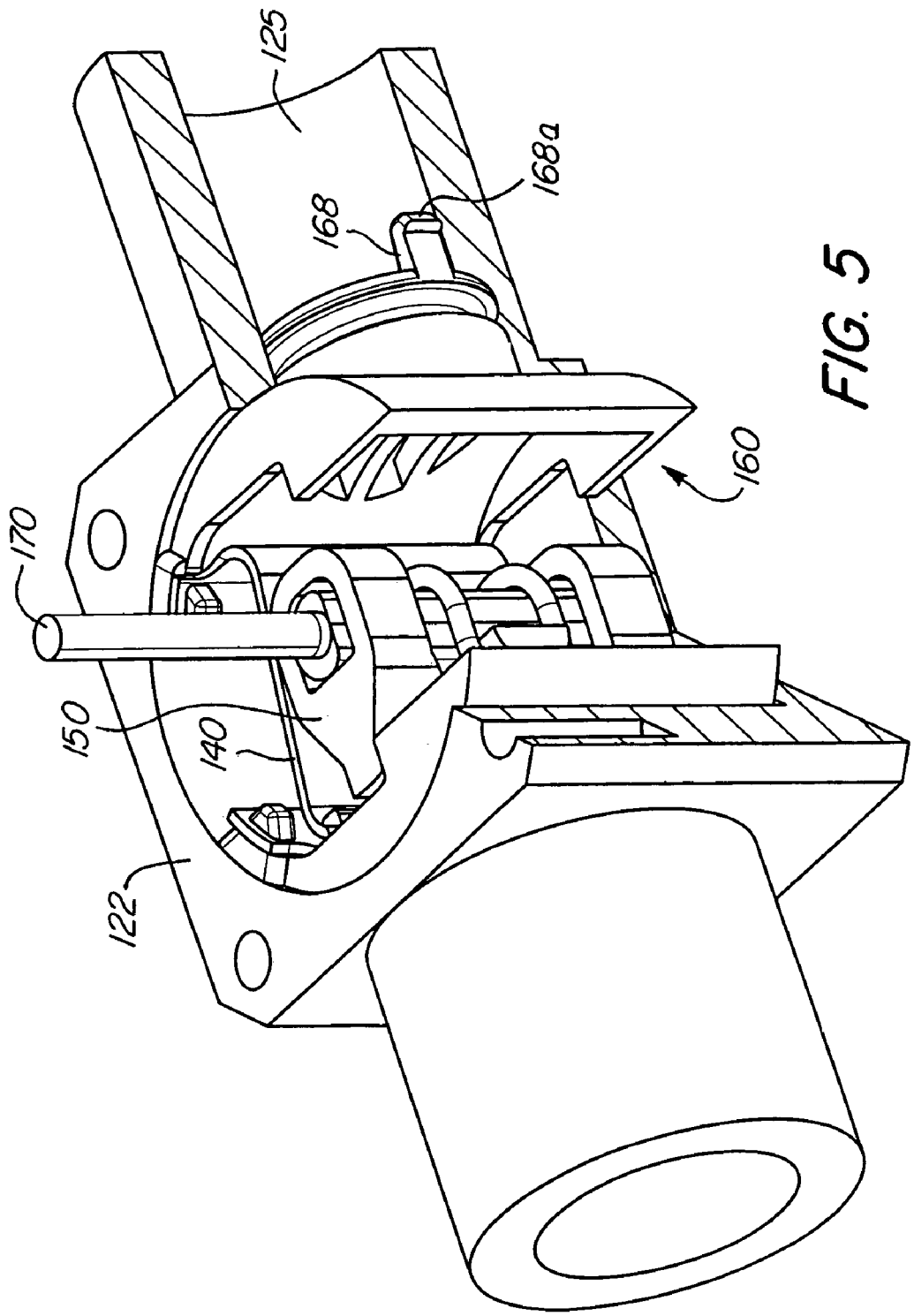
FIG. 5 is a perspective view, partially cut away, of a valve as shown in FIG. 4, with the cover removed and the inlet and a portion of the right outlet port removed.
Figure 6A:
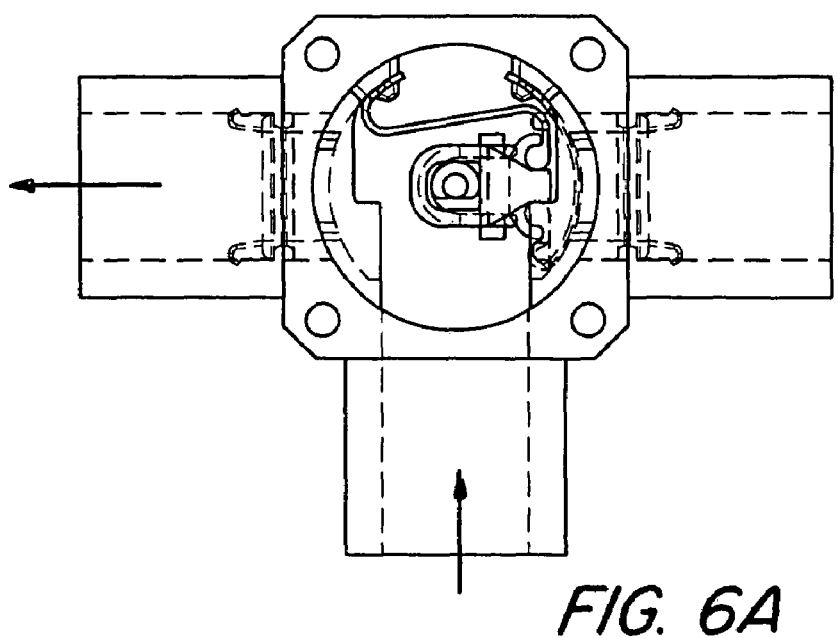
FIG. 6A is a top plan view of a valve as shown in FIG. 5 with the cover removed and the curtain closure directing flow out of the left outlet port.
Figure 6B:
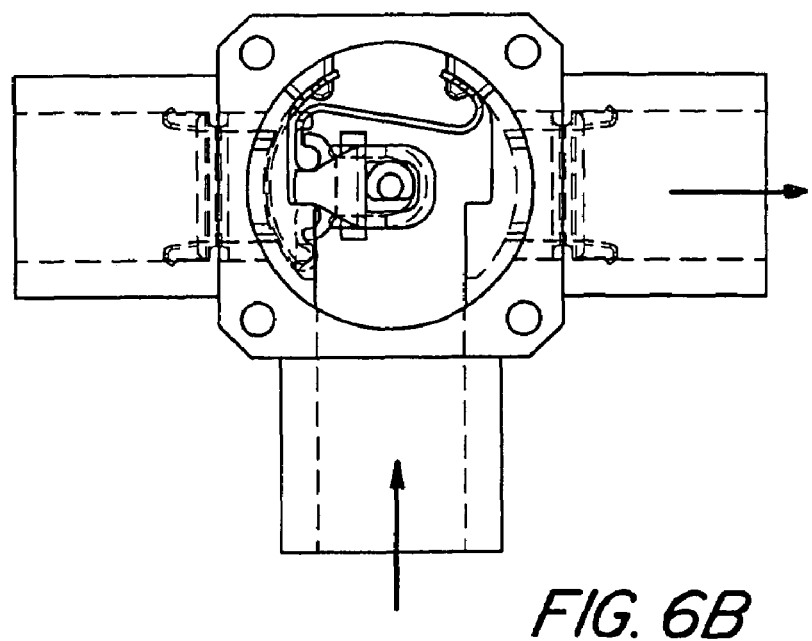
FIG. 6B is a top plan view of a valve as shown in FIG. 5 with the cover removed and the curtain closure directing flow out of the right outlet port.

FIG. 4 is an exploded perspective view showing a three-way valve according to the invention and similar in many regards to the two-way valve of FIGS. 1 through 3E, just described. FIG. 5 is a perspective view, partially cut away, of a valve as shown in FIG. 4, with the cover removed and the inlet and a portion of the right outlet port removed. The operation of this valve is illustrated by FIG. 6A, which is a top plan view of the valve with the cover removed and the curtain closure directing flow out of the left outlet port. FIG. 6B is a similar view with the curtain closure directing flow out of the right outlet port. Parts in this embodiment which correspond to numbered parts in the embodiment of FIGS. 1–3E will be given three digit numbers starting with 1 and ending with the two digit numbers assigned for FIGS. 1–3E. Thus, for example the valve body 122 in FIG. 4 corresponds to valve body 22 in FIG. 1, and so on. Accordingly, this description, for conciseness, need only refer to differences not readily apparent and structure associated with them. The primary difference between this embodiment and that of FIG. 1 is obviously the provision of an additional out port 125' and the elements necessary for operation of the closure between the two outlets.

FIG. 7A is a side elevation of an alternative two-way valve according to the invention. FIG. 7B is a top plan view of a valve as shown in FIG. 7A. FIG. 7C is a cross section taken along line 7C—7C in FIG. 7A. It can be seen from FIG. 7C that the pivot arm 250 is of a different cross section than that of the other embodiments. Here, the pivot arm 250 is a half toroidal section having one end of curtain 240 attached at point 252 and the other end attached at point 262 on the outlet closure support 260. The shaft 270 is shown as a straight shaft without a camming function. In this embodiment, the pivot arm does not have a shoe function and is not adapted for radial movement. However, this feature could be accomplished in the preferred or an alternate form.

Figure 7E:
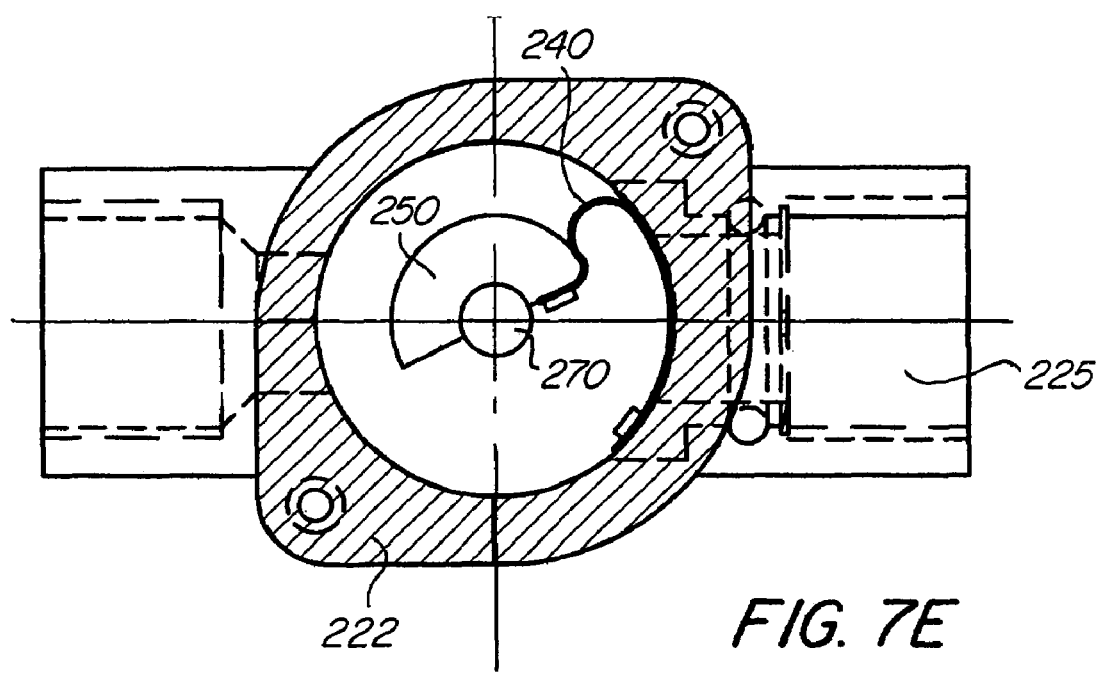
FIG. 7E is a top plan view of a two-way valve of the type shown in FIGS. 7A–7D, with the cover removed.
Figure 7F:
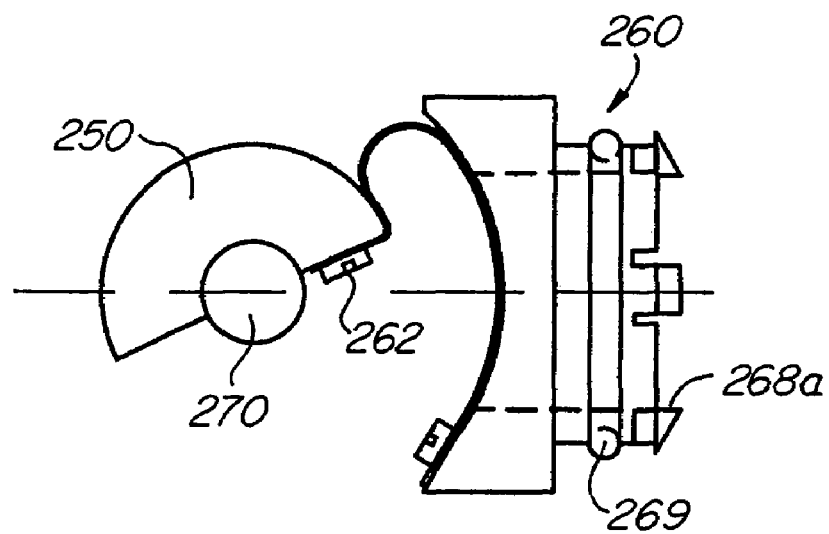
FIG. 7F is a top view of a valve insert for a valve of the type shown in the views of FIGS. 7A–7D.
Figure 7G:
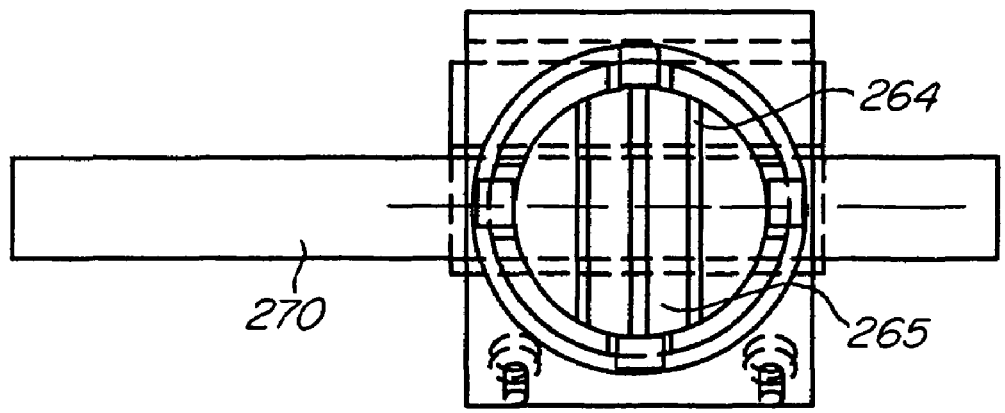
FIG. 7G a front elevation a valve insert for a valve of the type shown in the views of FIGS. 7A–7D.

FIG. 7D is a cross section taken along line 7D—7D in FIG. 7B. FIG. 7E is a top plan view of a two-way valve of the type shown in FIGS. 7A–7D, with the cover removed. It can be seen from this figure that the first diaphragm support 252 is comprise of two threaded screws. FIG. 7F is a top view of a valve insert for a valve of the type shown in the views of FIGS. 7A–7D. The insert 230 is comprised of flexible diaphragm 240, pivot arm 250, support 260 and shaft 270 a front elevation a valve insert for a valve of this type is shown FIG. 7G.

Figure 8A:
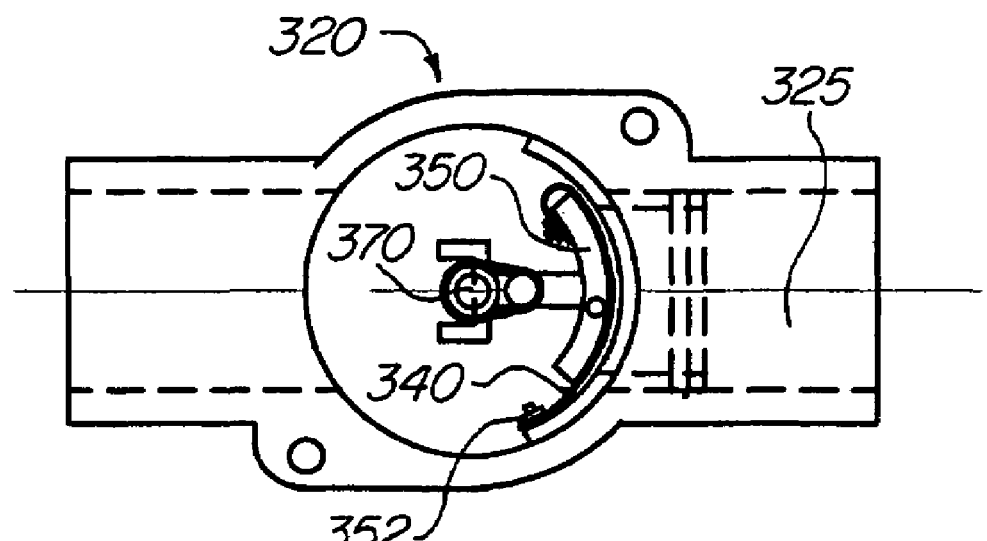
FIG. 8A is a top plan view of a two-way valve of the invention with the cover removed to show an axially and radially moveable shoe to position and press the curtain valve closure into closed position.
Figure 8B:
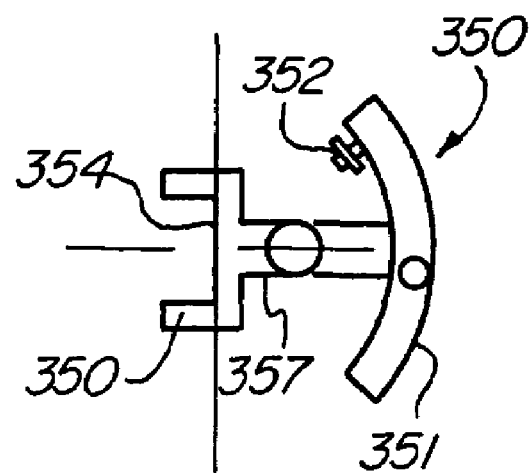
FIG. 8B is a top plan view showing some detail of a shoe for a valve of FIG. 8A.

FIG. 8A is a top plan view of an alternate form of two-way valve 320 of the invention with the cover removed to show an axially and radially moveable shoe 350 to position and press the curtain valve closure 340 into closed position over valve outlet 325. The first support 352 for the diaphragm 340 moves with the shoe 350 and comprises a set of screws and washers. FIG. 8B is a top plan view showing some detail of a shoe 350 for a valve of FIG. 8A. The shoe 350 includes a frame 357 connecting front surface 351 with a rear portion 358 having an opening with front edge 354. The frame 357 includes vertically oriented posts 357 for holding resilient bands 356, preferably O-rings or otherwise of rubber or spring material. For an elevation of the shoe 350, including the posts 356 and the bands, see FIG. 8J which is a cross section of the valve shown in FIG. 8A, taken on a line 8J—8J in FIG. 8H.

Figure 8C:
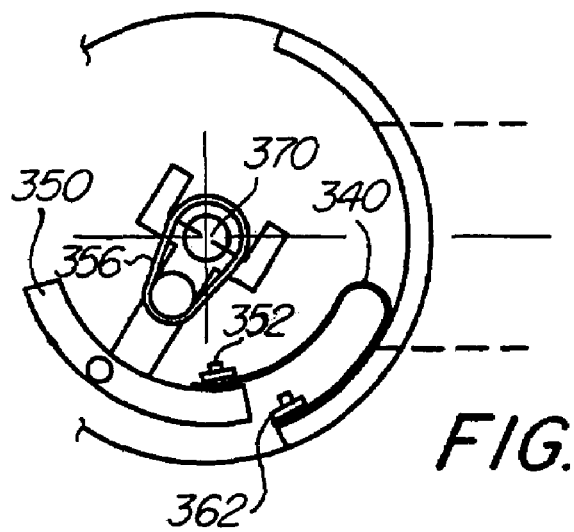
FIG. 8C is a schematic view showing an axial position of a shoe of the type in FIG. 8A in an open position.
Figure 8D:
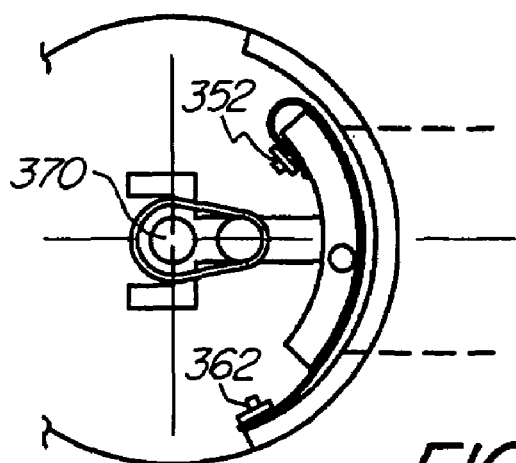
FIG. 8D is a schematic view showing an axial position of a shoe of the type in FIG. 8A in a closed, but not yet axially extended, position.
Figure 8E:
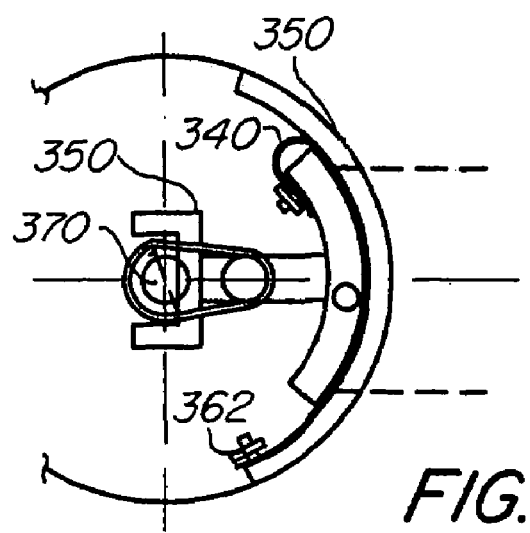
FIG. 8E is a schematic view showing an axial position of a shoe of the type in FIG. 8A in a closed and fully axially extended position.
Figure 8F:
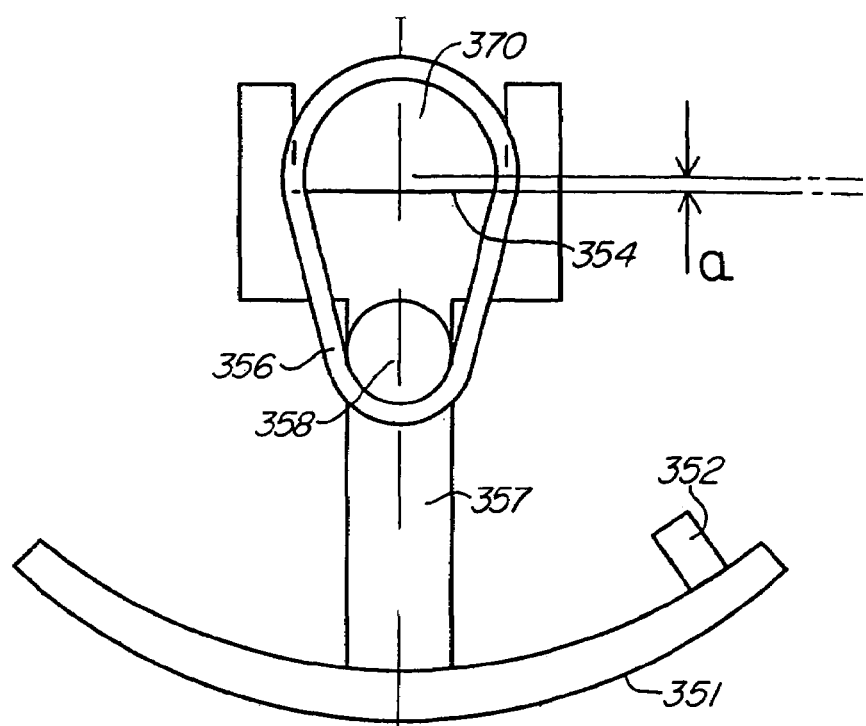
FIG. 8F is a schematic view showing the detail of a cam arrangement holding the shoe and closure curtain in the position shown in FIG. 8D.
Figure 8G:
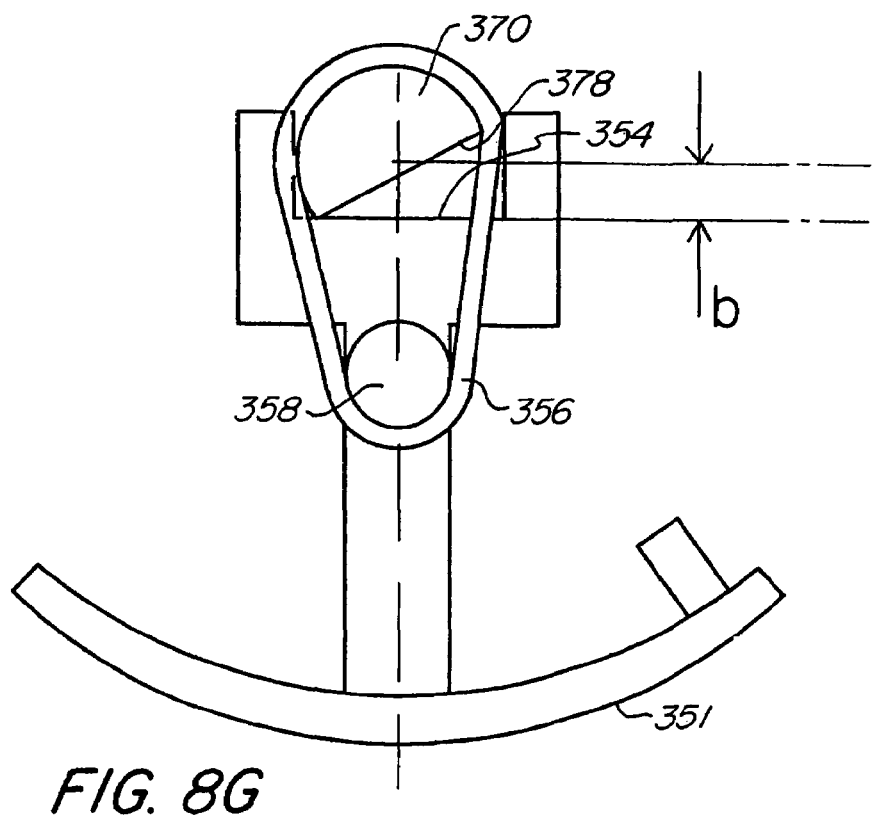
FIG. 8G is a schematic view showing the detail of a cam arrangement holding the shoe and closure curtain in the position shown in FIG. 8E.

Operation of this embodiment will become more clear from the simplified sketches of FIGS. 8C through 8G. FIG. 8C is a schematic view showing an axial position of a shoe of the type in FIG. 8A in an open position. Here, shaft 370 can be seen moving the shoe 350 axially counterclockwise toward the closed position. FIG. 8D is a schematic view showing an axial position of a shoe 350 in a closed, but not yet axially extended, position. And, FIG. 8E is a schematic view showing an axial position of a shoe 350 in a closed and fully axially extended position. In this position, the front surface 351 of the shoe 350 is pressing against the diaphragm 340 to provide closing pressure against the opening 325. The shaft 370 has rotated past the stop position of FIG. 8D and caused the shoe 350 to advance axially as indicated by the arrow. FIG. 8F is a schematic view showing the detail of a cam arrangement holding the shoe 350 in the position shown in FIG. 8D. A distance a is indicated as substantially zero showing the distance between the center of shaft 370 and the front surface 354 of the opening in frame 357. FIG. 8G is a schematic view similar to FIG. 8G, but shown holding the shoe 350 in the position shown in FIG. 8E. Here, the distance between the center of shaft 370 and the front surface 354 is a finite distance b sufficient to cause radial motion of the shoe to press diaphragm 340 against opening 325 as shown in FIG. 8E. Resilient bands 356 are biased toward the open position and positive force on the shaft 370 is required in this embodiment to maintain the shown radial extension. When actuator force is removed, the shoe 350 will resume the position shown in FIG. 8F.

Figure 8I:
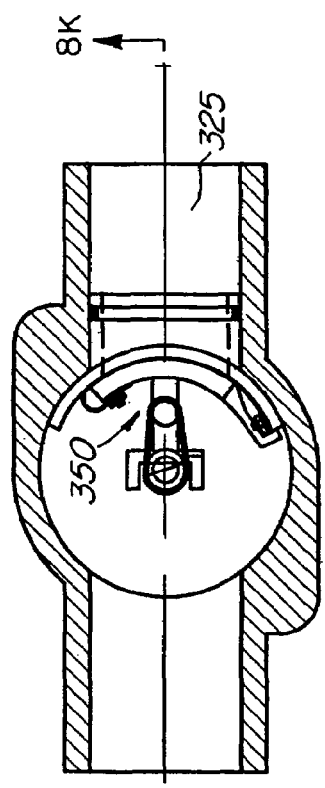
FIG. 8I is a top plan view of the valve shown in FIG. 8E, shown with the cover removed.
Figure 8H:
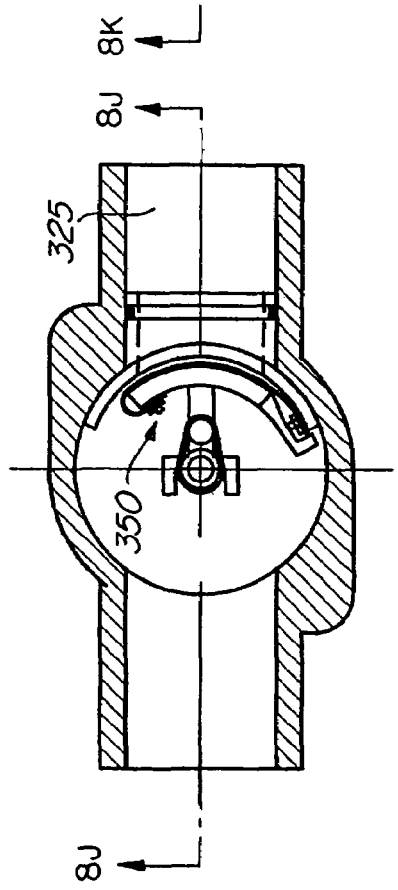
FIG. 8H is a top plan view of the valve shown in FIG. 8D, shown with the cover removed.

The interrelationship of the structure of this alternative form of valve can be best seen in FIGS. 8H through 8K. Not all parts are shown numbered to avoid clutter, but have the numbers seen in the other views of this embodiment. FIG. 8H is a top plan view of the valve shown in FIG. 8D, shown with the cover removed. The shoe 350 is shown in closed but not locked position. FIG. 8I is a top plan view of the valve shown in FIG. 8E, shown with the cover removed and the shoe 350 is closed and radially-extended locked position. FIG. 8K is a cross section of the valve shown in FIG. 8A, taken on a line 8K—8K in FIG. 8I. FIGS. 8J and 8K show diaphragm support members 364 and flow passageways 365 as they are open in FIG. 8J and closed in FIG. 8K.

FIG. 8L is a front elevation a valve insert for a valve of the type shown in the views of FIGS. 8A–8K. FIG. 8M is a curtain closure element 340 for a valve of the type shown in the views of FIGS. 8A–8K. Moveable end 342 has openings to secure it to the shoe 350 at locations 352 and the other end is a fixed end to be secured to a stationary member 362 as previously described. FIG. 8N is an actuator shaft 370 for a valve of the type shown in the views of FIGS. 8A–8K. The actuator shaft 370 includes a central drive shaft 372, an enlarged cam section 374 having a substantially rounded surface 376, a flattened area 378 and grooves 379 for holding resilient bands 356.

Figure 9A:
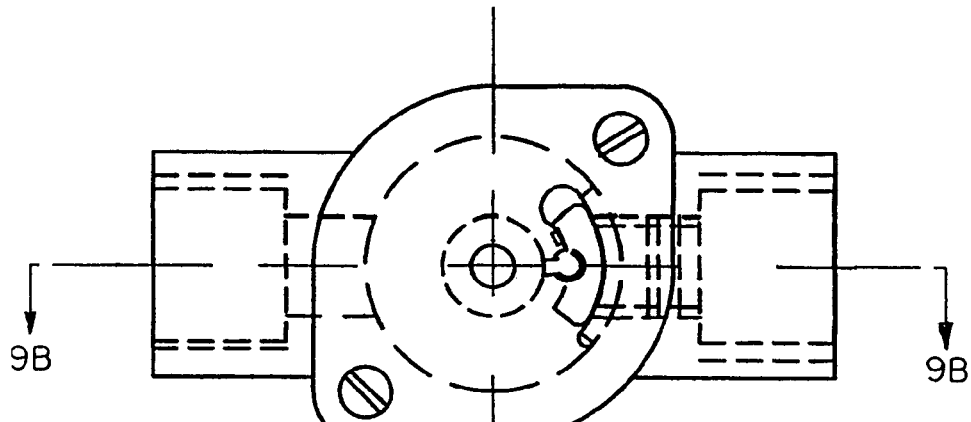
FIG. 9A is a top plan view of another two-way valve according to the invention with an alternative shoe and cam structure.
Figure 9B:
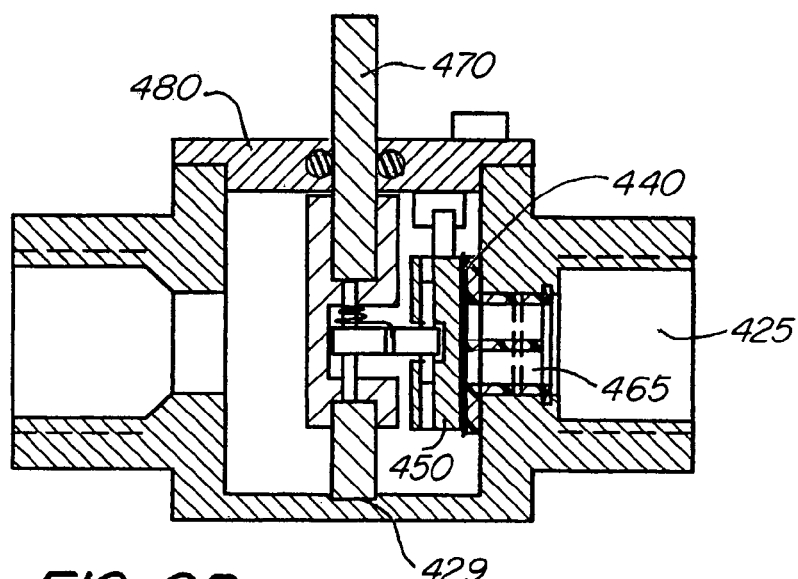
FIG. 9B is a cross sectional view taken along line 9B—9B in FIG. 9A.
Figure 9C:
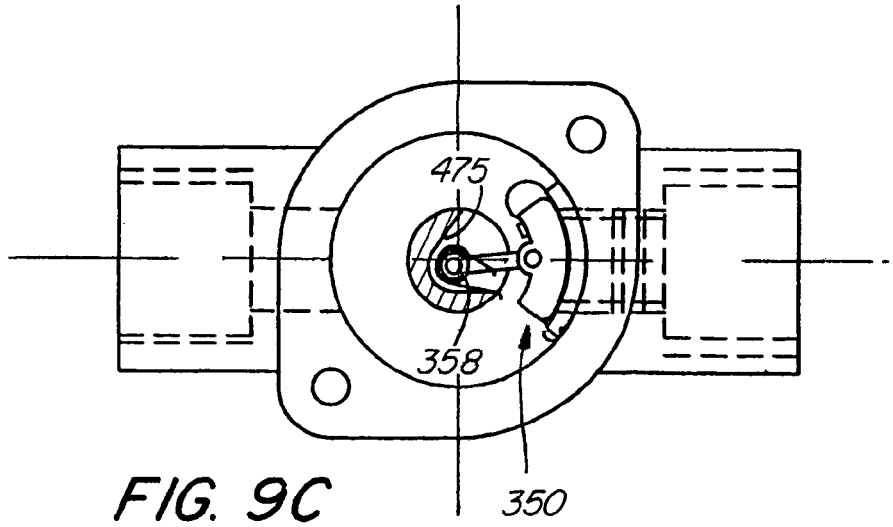
FIG. 9C is a view similar to FIG. 9A, but with the cover removed.

FIGS. 9A through 9C show another alternative structure with an axial and radially moveable shoe 450, but with a distinct camming arrangement to begin the radial movement when axial movement of the shoe 450 has been brought to a closed, but not locked position as in FIG. 9C. FIG. 9A is a top plan view of this two-way valve according to the invention with an alternative shoe and cam structure. FIG. 9B is a cross sectional view taken along line 9B—9B in FIG. 9A and illustrates the diaphragm 440 positioned over openings 465 at outlet 425 due to rotation of shaft 470 while held in cover 480 and central body recess 429. FIG. 9C is a view similar to FIG. 9A, but with the cover removed to show an elongated V-shaped groove 475 on shaft 470 to press against follower 358, biased by spring 359, on shoe 350. With the exception of the camming structure, the valve can have the structure and operation as in any of the other embodiments.

Figure 10A:
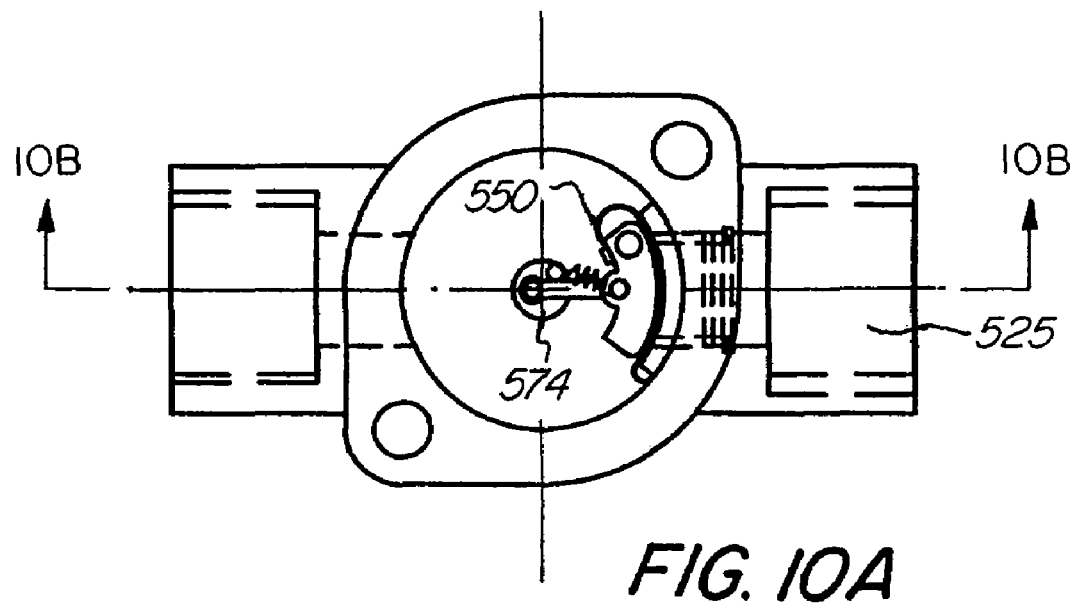
FIG. 10A is a top plan view of another two-way valve according to the invention with the cover removed to reveal an alternative shoe and cam structure.
Figure 10B:
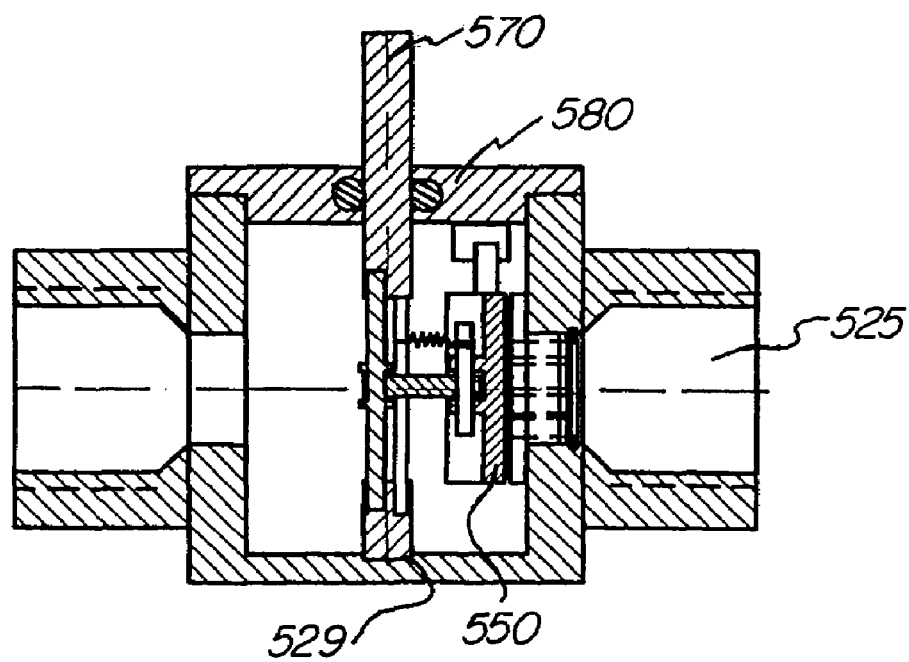
FIG. 10B is a cross sectional view taken along line 10B—10B in FIG. 10A.
Figure 10D:
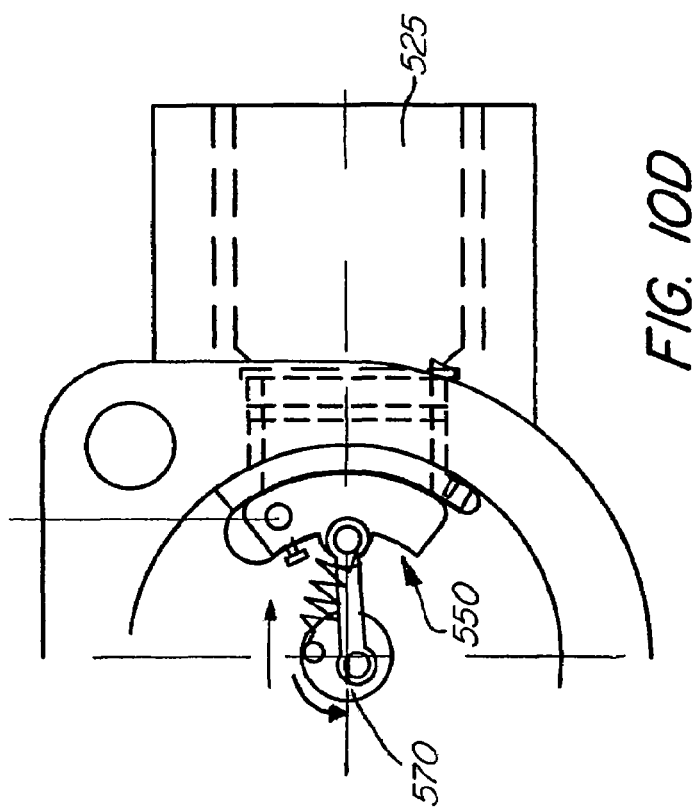
FIG. 10D is a cut-away schematic of the valve shown in FIG. 10A, showing the shoe and curtain in closed, fully extended position.
Figure 10C:
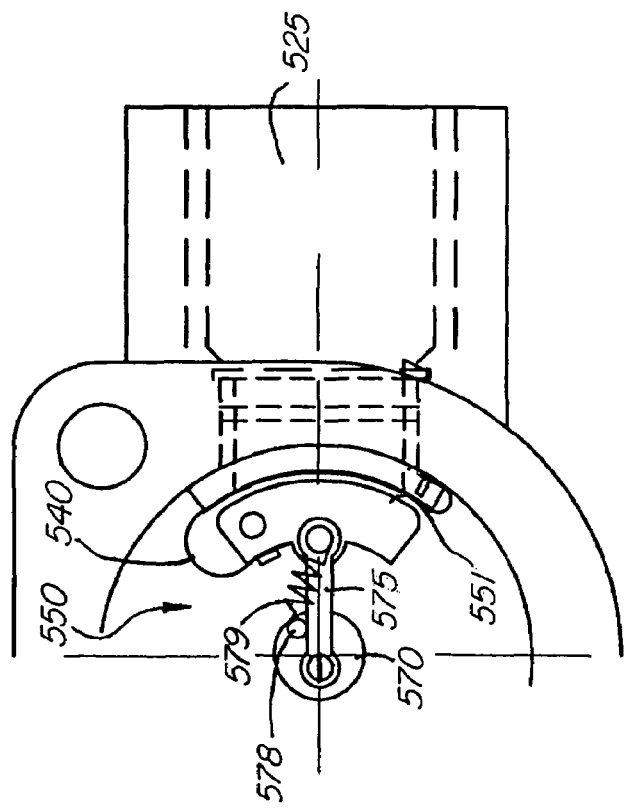
FIG. 10C is a cut-away schematic of the valve shown in FIG. 10A, showing the shoe and curtain in closed, but not extended position.
Figure 10E:
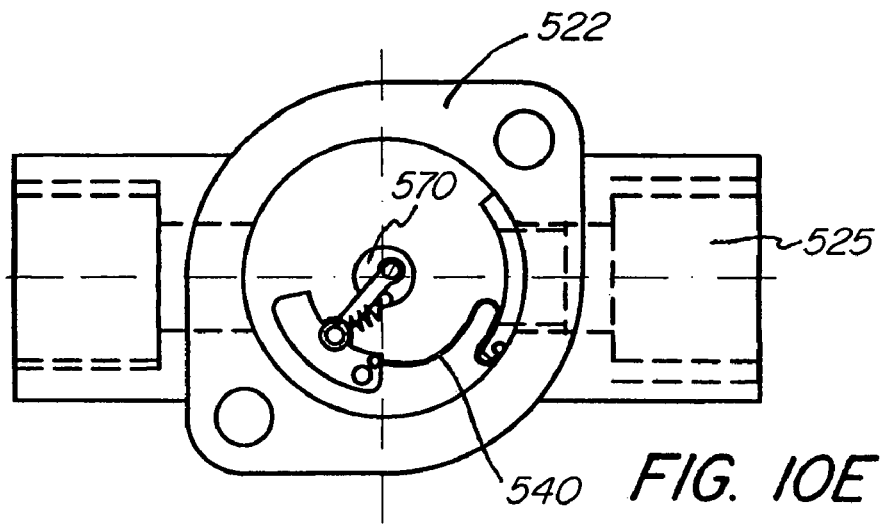
FIG. 10E is a top plan view of the valve shown in FIG. 10A, showing the shoe and curtain in open position.
Figure 10F:
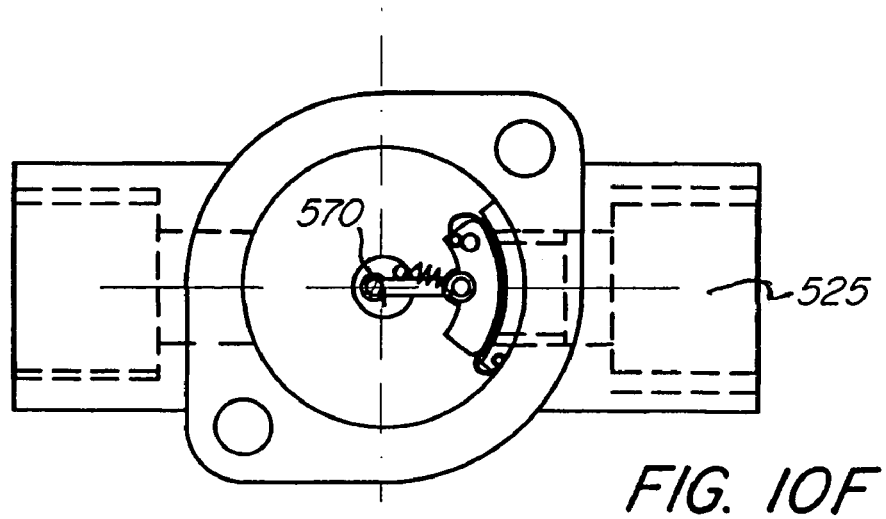
FIG. 10F is a top plan view of the valve shown in FIG. 10A, showing the shoe and curtain in closed, but not extended position.
Figure 10G:
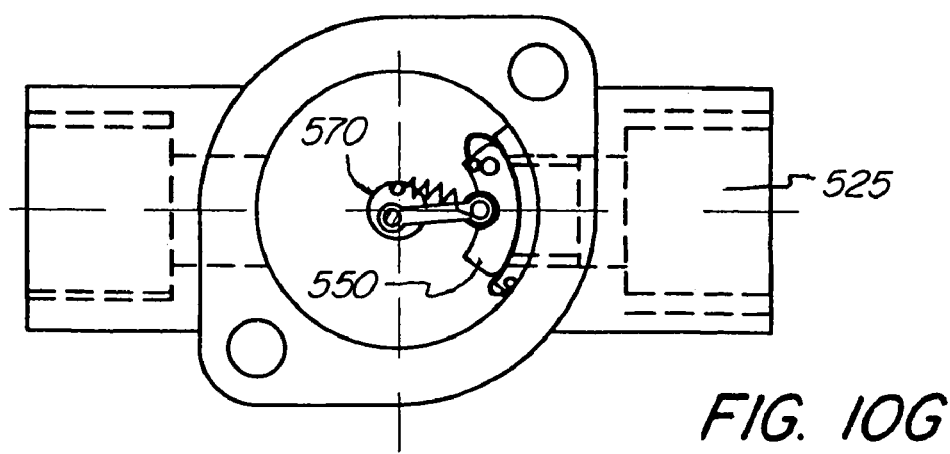
FIG. 10G is a top plan view of the valve shown in FIG. 10A, showing the shoe and curtain in closed and extended position.

FIGS. 10A and 10G are views of another two-way valve according to the invention. Again, with the exception of a camming structure, the valve can have the structure and operation as in any of the other embodiments. FIG. 10A is a top plan view with the cover removed to reveal an alternative shoe 550 and cam structure 574. FIG. 10B is a cross sectional view taken along line 10B—10B in FIG. 10A. FIG. 10C is a cut-away schematic of the valve shown in FIG. 10A, showing the shoe and curtain in closed, but not extended position. In this view, the shaft 570 is seen to include a spring holder 578 and an eccentrically-positioned crank arm 575 which perform the functions provided in the previous embodiment by a camming structure. The eccentrically-positioned crank arm 575 causes radial outward closing movement of shoe 550 against biasing spring 579 when the shoe is in position to seal the opening 525 by pressing the diaphragm 540 into it as accomplished in the other embodiments. FIG. 10D is a cut-away schematic of the valve shown in FIG. 10A, showing the shoe and curtain in closed, fully extended position. Again, counter clockwise movement of the shaft 570 has caused the shoe 550 to be extended radially. For a more complete view of the movement, FIGS. 10E through 10G are provided. FIG. 10E is a top plan view of the valve shown in FIG. 10A, showing the shoe and curtain in open position. FIG. 10F is a top plan view of the valve shown in FIG. 10A, showing the shoe and curtain in closed, but not extended position. Finally, FIG. 10G is a top plan view of the valve shown in FIG. 10A, showing the shoe and curtain in closed and extended position.

Figure 11A:
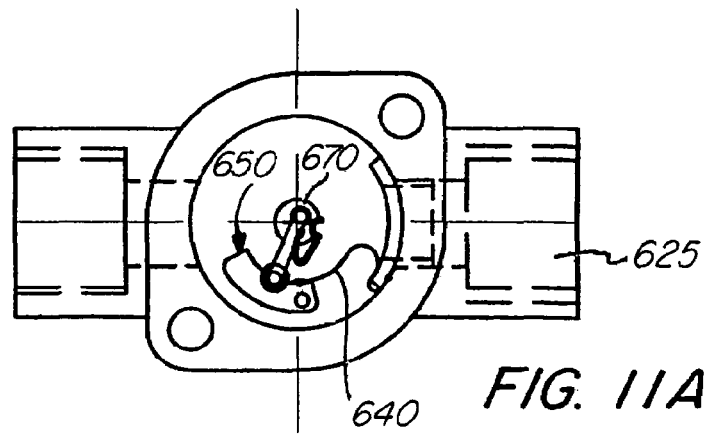
FIG. 11A is a top plan view of another two-way valve according to the invention with the cover removed to reveal an alternative shoe and cam structure and showing the closure in the open position.
Figure 11B:
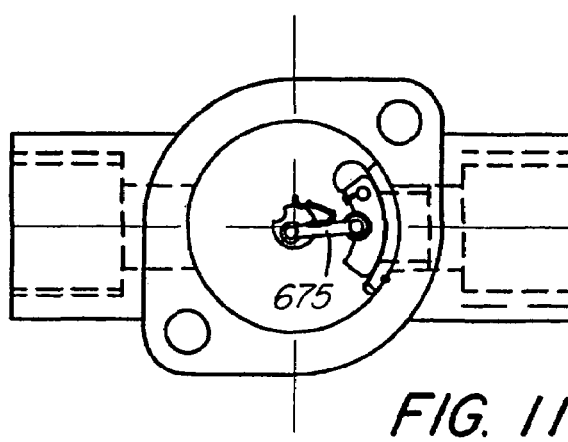
FIG. 11B is a top plan view of the valve shown in FIG. 11A showing the closure in the closed position.
Figure 11C:
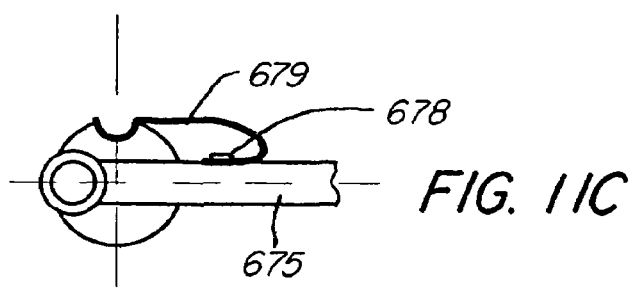
FIG. 11C is an enlarged top plan view of the camming structure locked by a spring mechanism in the open position as in FIG. 11A.
Figure 11D:
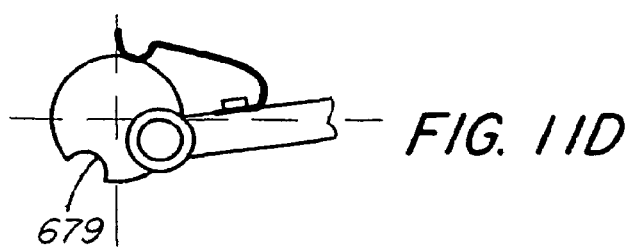
FIG. 11D is an enlarged top plan view of the camming structure unlocked in the closed position as in FIG. 11B.

FIGS. 11A and 10D are views of another two-way valve according to the invention. Here also, with the exception of a camming structure, the valve can have the structure and operation as in any of the other embodiments. FIG. 11A is a top plan view of a two-way valve with the cover removed to reveal an alternative shoe 650 and crank arm structure and showing the closure in the open position. In this view, the shaft 670 is seen to include a spring 578 and an eccentrically-positioned crank arm 675 which perform the functions provided in the previous embodiment by a camming structure. The eccentrically-positioned crank arm 675 causes radial outward closing movement of shoe 650 against biasing spring 679 when the shoe is in position to seal the opening 625 by pressing the diaphragm 640 into it as accomplished in the other embodiments. A locked position is reached when spring 679 snaps into recess 679' on shaft 670. FIG. 11B is a top plan view of the valve shown in FIG. 11A showing the closure in the closed position. FIG. 11C is an enlarged top plan view of the camming structure locked by a spring mechanism in the open position as in FIG. 11A. FIG. 11D is an enlarged top plan view of the camming structure unlocked in the closed position as in FIG. 11B.

Figure 12A:
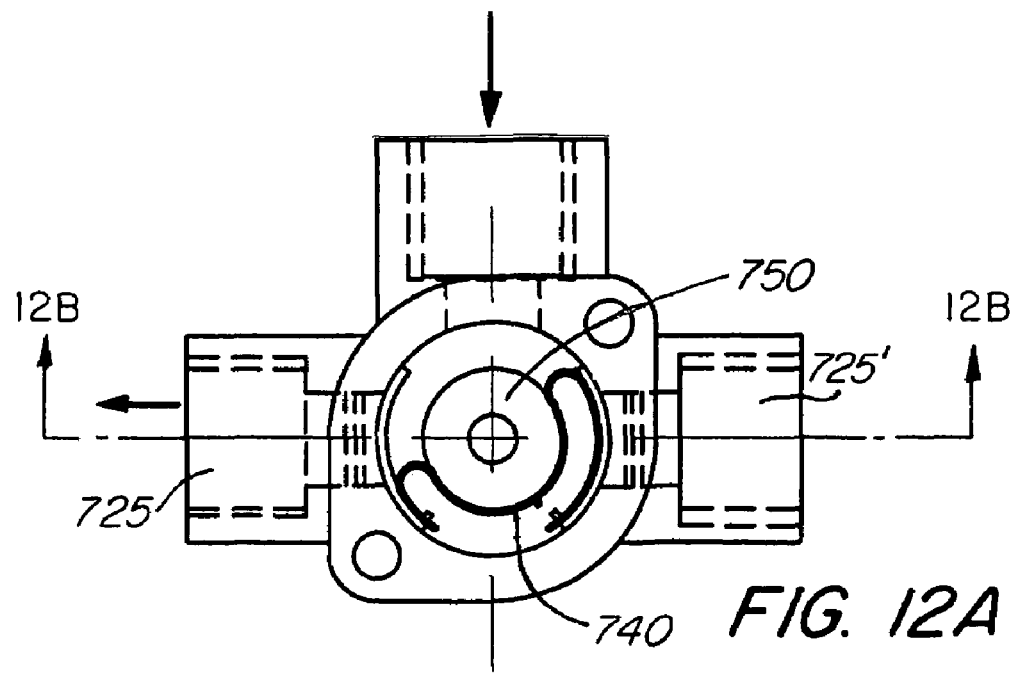
FIG. 12A is a top plan view, with the cover removed, of a three-way version of a valve of the type shown in the views of FIGS. 7A–7D.
Figure 12B:
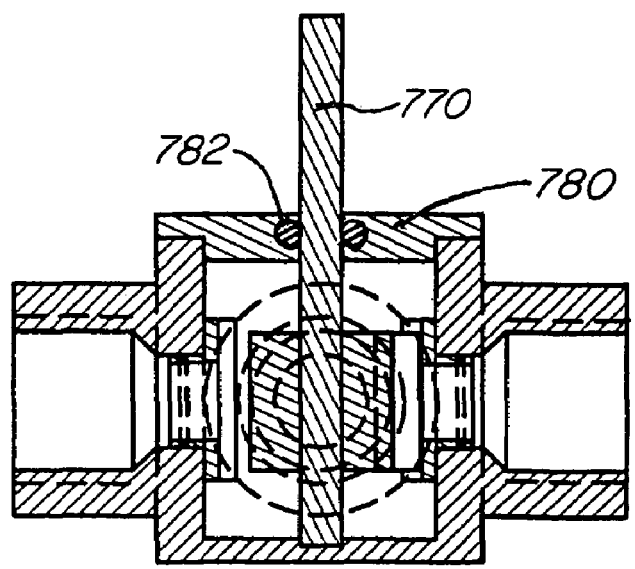
FIG. 12B is a cross sectional view taken along line 12B—12B in FIG. 12A.

FIG. 12A is a top plan view, with the cover removed, of a three-way version of a valve of the type shown in the views of FIGS. 7A–7D. FIG. 12B is a cross sectional view taken along line 12B—12B in FIG. 12A. Notable here are the cylindrical shoe 750 and the diaphragm 740 attached at two fixed locations to permit either of outlets 725 or 725' to be covered. With the exception of this structure, the valve can have the structure and operation as in any of the other embodiments.

FIG. 13A is a front elevation showing detail of a shoe face 151 having a sealing rim 156 extending above the surface. FIG. 13B is a top plan showing the shoe 150 and sealing rim illustrated in FIG. 13A.

FIGS. 14A–14F are front elevations followed by side views for three variations of curtain closures suitable for use in the valves of the invention.

Figure 15B:
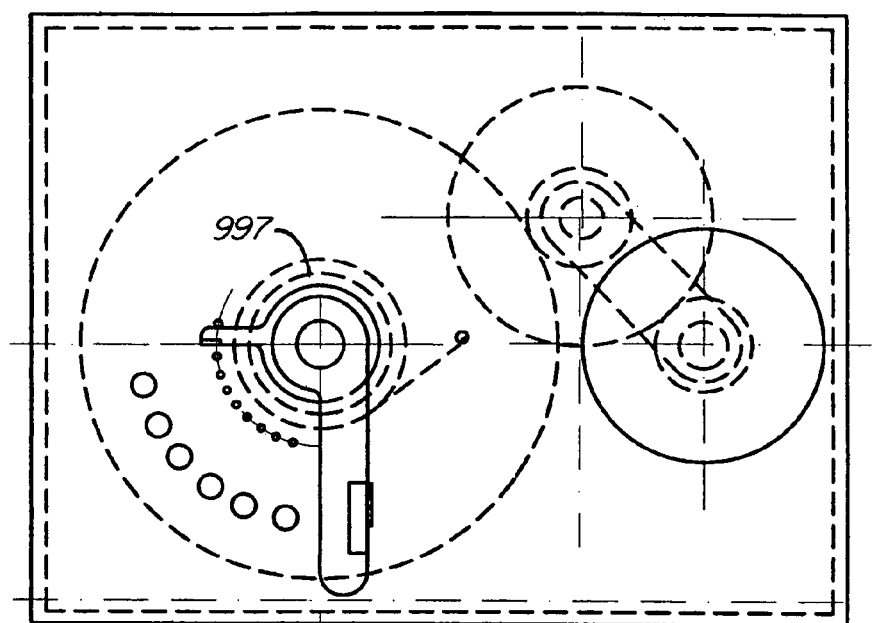
FIG. 15B is a top plan view of an actuator of the type shown in FIG. 15A.
Figure 15A:
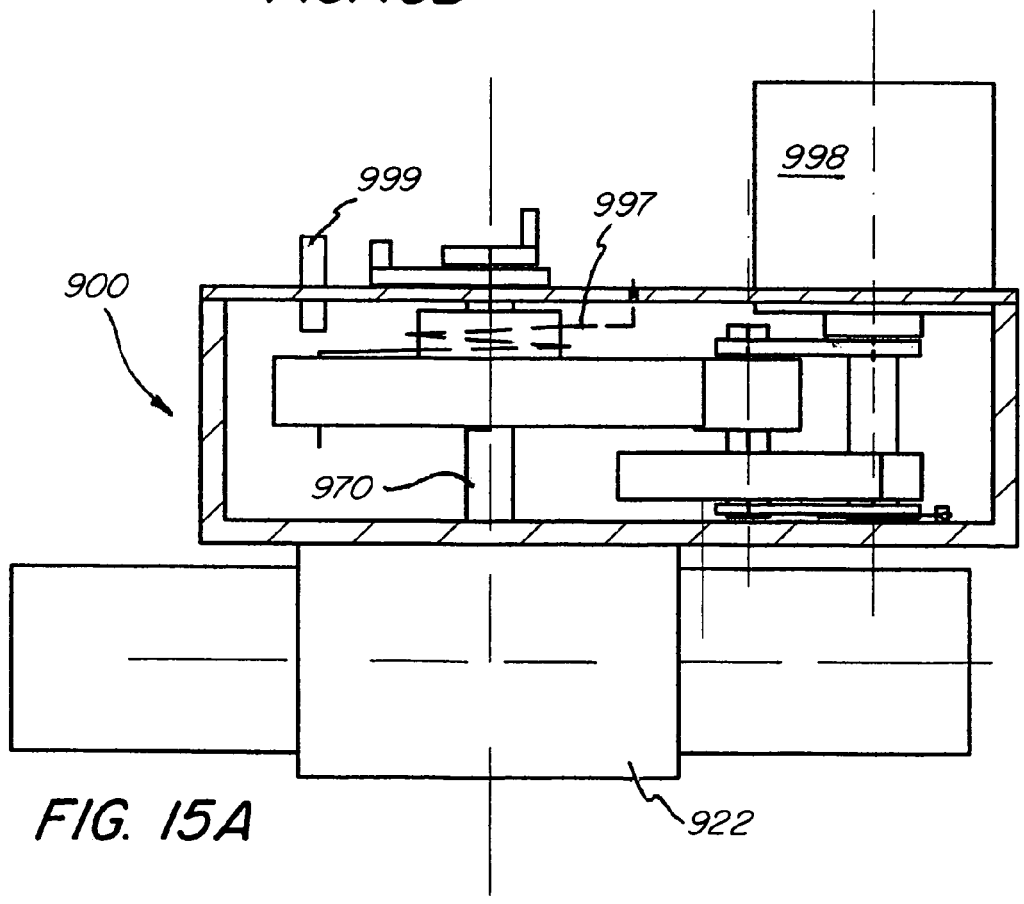
FIG. 15A is a side elevation view of a valve of the invention in operable configuration with a valve actuator with a side removed to show the interior.

FIG. 15A is a side elevation view of a valve of the invention in operable configuration with a valve actuator with a side removed to show the interior. FIG. 15B is a top plan view of an actuator 900 of the type shown in FIG. 15A. The advantage this whole design is that it takes a very small torque to operate this two-way or three-way valve. Because a very small torque is needed a very small motor (998) and return spring can be used. The gear train need only a modest reduction, which reduces cost and makes a stronger gear train possible. If there is no power to the motor, a spiral (torsion) return spring 997 acts upon the shaft and strives to turn it to the clockwise position and close the valve. The return spring will overcome the friction in the motor, gear train and the small torque needed to operate the valve. When electric power is connected to the motor, it runs and will overcome the torque required to operate the valve. Stop pin 999 limits movement of shaft 970 and can be moved to any of various points (e.g., holes 995) to adjust the flow coefficient of the valve. The motor runs until it reaches the counter clockwise position where it stalls and the valve is open. The final gear can be a cogwheel or cogwheel segment, but a wheel with an O-ring driven by a smaller wheel is also a possibility. The low torque requirement makes it a possibility which eliminates the wear an tear of the cogwheel segment. The actuator can be of ON/OFF type or proportional.

In order to provide a multiple flow coefficients of a valve, an adjustable stop for the curtain of the valve can be utilized, so it opens to a different degree. This can be done by furnishing either the valve or actuator with an adjustable stop. The range of adjustment of the flow coefficient is rather wide. This is due to the design of the valve, with a rather wide turning of the shaft to operate the valve. Thereby adjustment can be done in rather large increments. A conventional valve would require a very fine adjustment of the arm with the disk. Because of the very small torque requirement to operate the valve many other types of actuators than the above described can be used. Such as, electromagnetic, heated bimetal and heated wax elements with rack and pinion.

Figure 16:
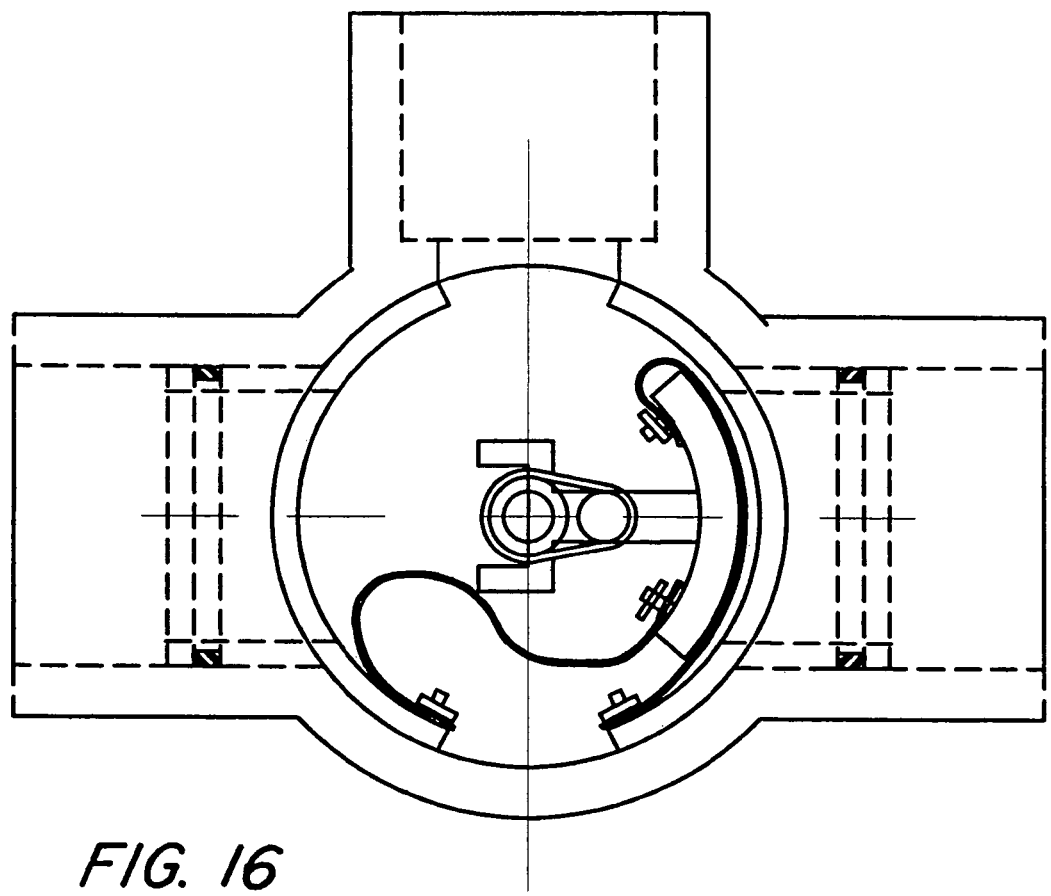
FIG. 16 is a top plan view of another form of valve of the invention wherein the closure is arranged to close off either of two outlet ports.

FIG. 16 is a top plan view of another form of valve of the invention wherein the closure is arranged to close off either port, enabling use of either as the inlet or the outlet.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

I claim:

1. A curtain value comprising:
   a valve body having an inside surface,
   an inlet port comprised of an opening through said inside surface of said valve body and enabling fluid flow into the valve body,
   an outlet port comprised of an opening through said inside surface of said valve body and enabling fluid flow from the valve body, and
   a closure insert comprising
      a pivotable shaft,
      a pivot arm on said pivotable shaft,
      a closure support extending over said opening of said outlet port when positioned in said valve body, and
      a flexible diaphragm as a curtain valve closure for controlling fluid flow through said outlet port between a closed position wherein it covers said outlet port and an open position wherein it is displaced circumferentially relative to said pivotable shaft from said outlet port, said flexible diaphragm being extended between two locations, one of said two locations being a pivotally-moveable support on said pivot arm and the other location being a fixed support on said closure support, whereby pivotal movement of said shaft moves said pivot arm through a portion of a full turn and, thereby, moves said flexible diaphragm between said open and said closed positions.

2. A curtain valve according to claim 1 wherein said insert includes a lip which engages said mating surface on said valve body.

3. A curtain valve according to claim 1 wherein at least one portion of said insert nests in a recess including said mating surface on said valve body.

4. A curtain valve according to claim 1 wherein said valve body comprises at least one access opening to permit said insert to be positioned at least partially within and removed from said outlet port.

5. A curtain valve according to claim 1, wherein said insert comprises a portion which extends through said outlet port.

6. A curtain valve according to claim 5, wherein said portion of said insert which extends though said outlet port comprises a seal.

7. A curtain valve according to claim 6, wherein said seal comprises an 0-ring.

8. A curtain valve according to claim 6, wherein said seal comprises an integrally molded section of said insert.

9. A curtain valve according to claim 1, wherein said insert comprises at least one means for forming a mechanical interlock with said valve body.

10. A curtain valve according to claim 1, wherein said insert includes a closure support positioned at least partially within said outlet port and having at least one dimension larger than a mating surface on said valve body to secure and orient said insert within said outlet port.

11. A curtain valve according to claim 10, wherein said closure support comprises at least one member suspended over said opening.

12. A curtain valve according to claim 10, wherein said closure support comprises a plurality of support members extending over said opening and dividing it into at least two passages.

13. A curtain valve according to claim 1 wherein at least one portion of said closure support nests in a recess including said mating surface on said valve body.

14. A curtain valve according to claim 1 wherein said closure support includes a lip that engages said mating surface on said valve body.

15. A valve having an adjustable flow coefficient, operable at very low torque and particularly useful for controlling flow of heat transfer fluids in heating, air conditioning and ventilation systems, which comprises:
    a valve body having an inside surface,
    an inlet port comprised of an opening through the inside surface and enabling fluid flow into the valve body,
    an outlet port comprised of an opening through the inside surface and enabling fluid flow from the valve body,
    a pivotable shaft,
    a pivot arm on said pivotable shaft,
    a closure support, and
    a curtain valve closure moveable circumferentially relative to said pivotable shaft though less than a full turn, wherein the closure is adjustable to different flow coefficients to control fluid flow through the outlet port and is of a modular design including a flexible diaphragm attached to said pivot arm at one end and to said closure support positioned at least partially within the outlet port, and said closure support has at least one dimension larger than a mating surface on the internal surface of the valve body to thereby secure said closure support to the valve body without fasteners and to properly orient it within the outlet port.

16. A curtain valve according to claim 15 wherein said valve body comprises at least one access opening to permit said closure support to be positioned at least partially within and removed from said outlet port.

17. A curtain valve according to claim 15, wherein said closure support comprises a portion which extends into said outlet port.

18. A curtain valve according to claim 17, wherein said portion of said closure support which extends though said outlet port comprises a seal.

19. A curtain valve according to claim 18, wherein said seal comprises an 0-ring.

20. A curtain valve according to claim 18, wherein said seal comprises an integrally molded section of said closure support.

21. A curtain valve according to claim 15, wherein said closure support comprises means for forming at least one mechanical interlock with said valve body.

22. A curtain valve according to claim 15, wherein said closure support includes a curtain valve support extending over an opening which aligns with said outlet port when positioned in said valve body.

23. A curtain valve according to claim 22, wherein said curtain valve support comprises at least one member suspended over said opening.

24. A curtain valve according to claim 22, wherein said curtain valve support comprises a plurality of support members extending over said opening and dividing it into at least two passages.

25. A curtain valve according to claim 15 wherein the closure support is installed by pushing the closure support in place in the outlet port without fasteners.

26. A curtain valve according to claim 15 wherein the comprises at least one latch means comprising a spring biased hook at its outlet end and said valve body comprises a recess to mate with said hook, whereby positioning of said hook within said recess secures said insert into said valve body in position in the outlet port.

27. A curtain valve according to any of the preceding claims wherein the insert is made of plastic.

28. A curtain valve according to claim 15 which is assembled by first assembling the shaft, rotor, and curtain outside of the valve body and then installing the assembled parts as one unit within the valve body.

* * * * *